(12) United States Patent  
Humphrey et al.

(10) Patent No.: US 11,617,994 B2  
(45) Date of Patent: Apr. 4, 2023

(54) GAS INFUSER FOR LIQUIDS

(71) Applicant: BUNN-O-MATIC CORPORATION, Springfield, IL (US)

(72) Inventors: Matthew C. Humphrey, Springfield, IL (US); Mark W. Bandixen, Springfield, IL (US); John Tigo, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 16/968,328

(22) PCT Filed: Feb. 6, 2019

(86) PCT No.: PCT/US2019/016781  
§ 371 (c)(1),  
(2) Date: Aug. 7, 2020

(87) PCT Pub. No.: WO2019/157015  
PCT Pub. Date: Aug. 15, 2019

(65) Prior Publication Data  
US 2021/0094004 A1 Apr. 1, 2021

Related U.S. Application Data

(60) Provisional application No. 62/628,035, filed on Feb. 8, 2018, provisional application No. 62/644,026, filed on Mar. 16, 2018.

(51) Int. Cl.  
*B01F 3/04* (2006.01)  
*B01F 25/30* (2022.01)  
(Continued)

(52) U.S. Cl.  
CPC ............. *B01F 25/30* (2022.01); *B01F 23/29* (2022.01); *B01F 35/7172* (2022.01);  
(Continued)

(58) Field of Classification Search  
CPC .... B01F 3/04985; B01F 5/04; B01F 15/0232; B01F 15/026; B01F 2003/049;  
(Continued)

(56) References Cited

U.S. PATENT DOCUMENTS 2,423,792 A 7/1947 Norway  
3,079,954 A 3/1963 Knapp  
(Continued)

FOREIGN PATENT DOCUMENTS

CN 1061894 6/1992  
CN 102773031 11/2012  
CN 105813671 7/2016

OTHER PUBLICATIONS

Search Report & Written Opinion issued in Int'l Appl. No. PCT/US2019/016781 (dated 2019).  
(Continued)

*Primary Examiner* — Charles S Bushey  
(74) *Attorney, Agent, or Firm* — Barnes & Thornburg LLP

(57) ABSTRACT

A gas infuser includes a mixing chamber and a liquid injector. Gas is supplied into the mixing chamber and liquid flows through openings of the injector to mix with the gas in the mixing chamber and form a gas-infused liquid.

19 Claims, 17 Drawing Sheets

(51) Int. Cl.
  *B01F 23/20* (2022.01)
  *B01F 35/71* (2022.01)
  *B01F 23/237* (2022.01)
  *B01F 101/14* (2022.01)

(52) U.S. Cl.
  CPC .. *B01F 35/71805* (2022.01); *B01F 23/23765* (2022.01); *B01F 23/237621* (2022.01); *B01F 2101/14* (2022.01)

(58) Field of Classification Search
  CPC .... B01F 2003/04921; B01F 2215/0022; B01F 23/237621; B01F 23/23765; B01F 23/29; B01F 25/30; B01F 35/7172; B01F 35/71805; B01F 2101/14
  USPC ........................................... 261/79.2, DIG. 7
  See application file for complete search history.

(56) References Cited

U.S. PATENT DOCUMENTS

| | | | | |
|---|---|---|---|---|
| 3,276,480 | A | | 10/1966 | Kennedy |
| 5,062,548 | A | * | 11/1991 | Hedderick ........... B67D 1/0004 222/190 |
| 5,621,180 | A | | 4/1997 | Simon |
| 5,749,233 | A | * | 5/1998 | Adolfsson ........... B01F 3/04808 222/129.1 |
| 6,457,855 | B1 | * | 10/2002 | Beirau ................. B01F 5/0403 366/336 |
| 7,624,970 | B2 | * | 12/2009 | Johansson ............ B01F 3/0446 261/79.2 |
| 8,177,197 | B1 | | 5/2012 | Ergican |
| 8,302,941 | B2 | * | 11/2012 | Nakashima ......... B01F 3/04269 261/64.3 |
| 9,795,936 | B2 | * | 10/2017 | Yasuda ................. B01F 5/0082 |
| 2010/0276819 | A1 | * | 11/2010 | Teng ..................... B01F 5/0646 261/31 |
| 2011/0199855 | A1 | | 8/2011 | Hanada |
| 2013/0270722 | A1 | | 10/2013 | Phillips et al. |
| 2014/0330204 | A1 | | 11/2014 | Huculak et al. |
| 2014/0342071 | A1 | * | 11/2014 | Psilander .............. B01F 5/0473 426/474 |
| 2017/0128895 | A1 | * | 5/2017 | Roe ..................... B01F 3/04503 |
| 2017/0245525 | A1 | * | 8/2017 | Kleinrichert .............. A23F 5/24 |
| 2017/0326508 | A1 | | 11/2017 | Bandixen et al. |

OTHER PUBLICATIONS

Extended Search Report issued in Appl. No. EP19751431.8 (dated Sep. 9, 2021).

Office Action issued in Appl. No. CN201980011548 (dated Nov. 25, 2021).

* cited by examiner

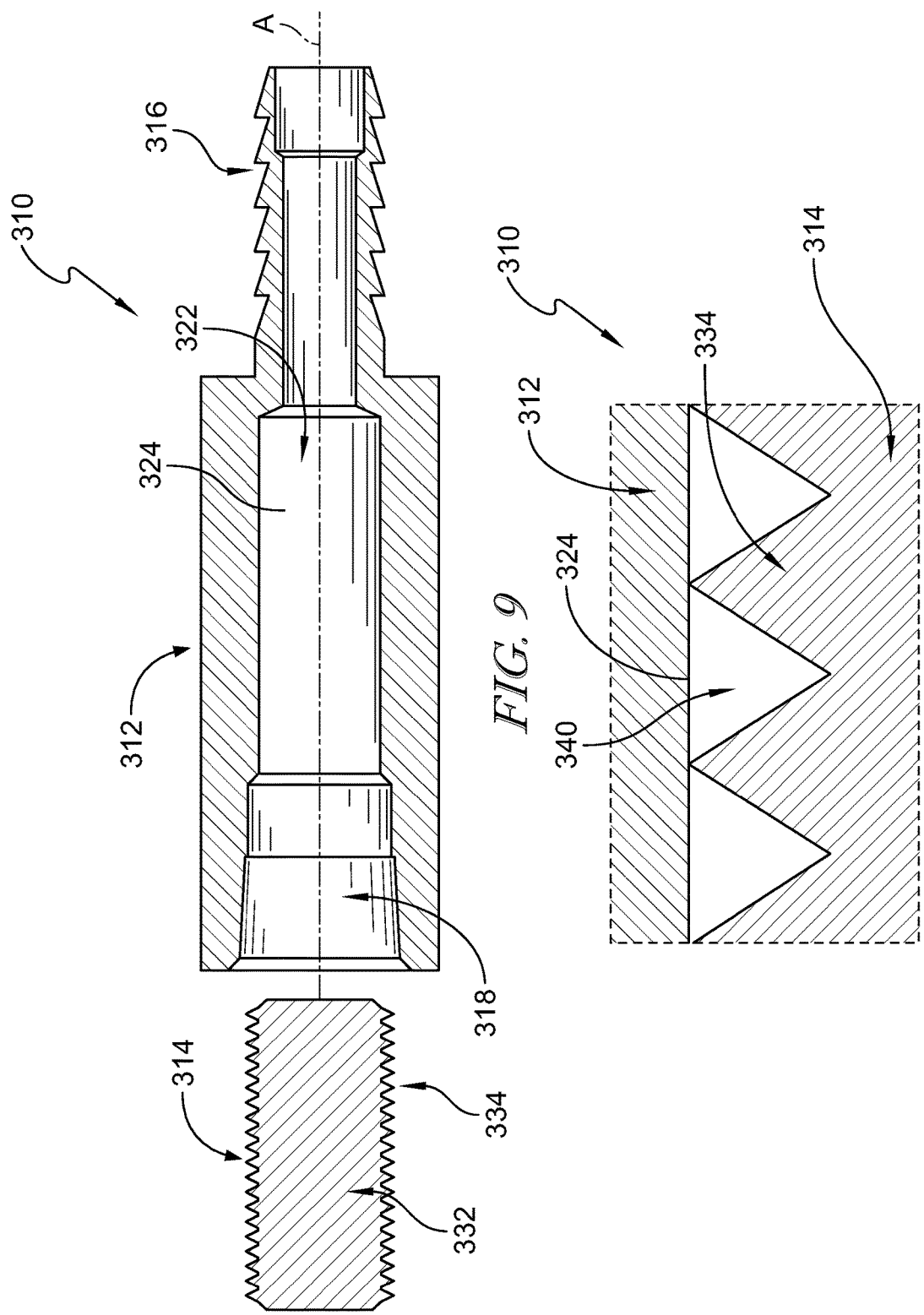

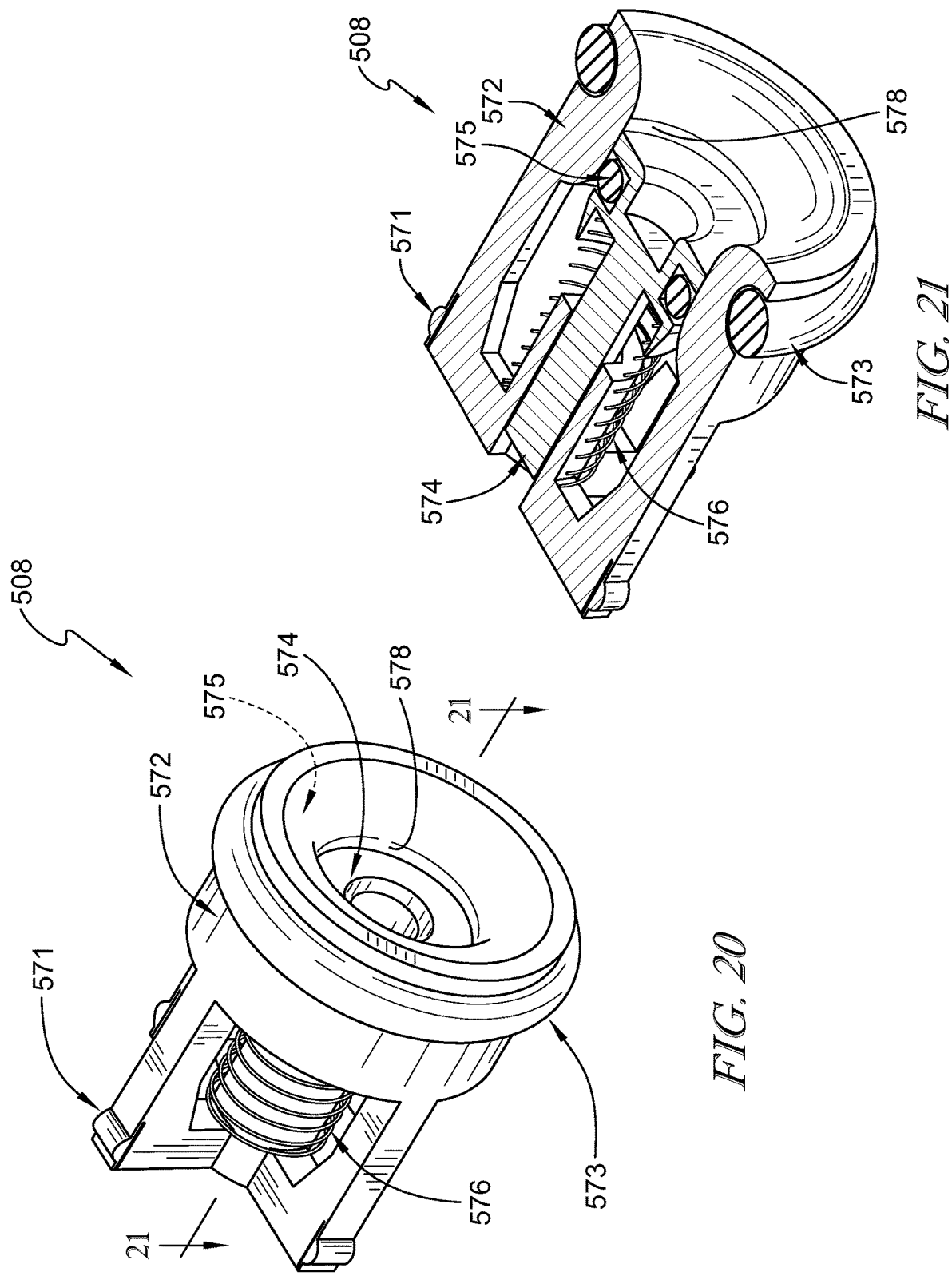

GAS INFUSER FOR LIQUIDS

CROSS REFERENCE TO RELATED APPLICATIONS

This application is a U.S. nationalization under 35 U.S.C. § 371 of International Application No. PCT/US2019/016781, filed 6 Feb. 2019, which claims priority under 35 U.S.C. § 119(e) to U.S. Provisional Application Ser. No. 62/628,035, filed Feb. 8, 2018, and 62/644,026, filed Mar. 16, 2018, the disclosures of which are expressly incorporated by reference herein in their entirety.

BACKGROUND

The present disclosure relates to gas infusers, and particularly to gas infusers for forming a gas-infused liquid. More particularly, the present disclosure relates to gas infusers for forming a gas-infused liquid used in beverages.

SUMMARY

According to the present disclosure, a gas infuser includes a mixing chamber and a liquid injector. Gas is supplied into the mixing chamber and liquid flows through openings of the injector to mix with the gas in the mixing chamber and form a gas-infused liquid.

In illustrative embodiments, the gas is supplied though a gas-volume controller coupled to the mixing chamber. The gas-volume controller includes a fitting and a capillary tube. An inlet of the fitting is separated from an outlet of the fitting such that gas passes from the inlet through the capillary tube to the outlet. A circuitous path is formed through the capillary tube to control a volume of gas that passes from the inlet to the outlet of the fitting substantially independent of pressure fluctuations of the gas at the inlet.

In illustrative embodiments, the capillary tube includes a coil and stems extending from opposing ends of the coil. One stem is positioned in an opening associated with the inlet of the fitting and the other stem is positioned in an opening associated with the outlet. The outlet is coupled to the mixing chamber.

According to another aspect of the present disclosure, the gas is supplied though a gas-volume controller coupled to the mixing chamber. The gas-volume controller includes a fitting and a plug. The plug is inserted into the fitting to separate an inlet of the fitting from an outlet. Internal threads of the fitting engage with the plug to form a circuitous path from the inlet to the outlet to control a volume of gas that passes through the gas-volume controller substantially independent of pressure fluctuations of the gas at the inlet.

In illustrative embodiments, an exterior of the plug is threaded and an interior of the fitting is smooth. The threads of the plug engage with the interior of the fitting to form the circuitous path.

In illustrative embodiments, an exterior of the plug is threaded and an interior of the fitting is threaded. The threads of the plug and fitting engage with one another. Peaks of the threads on the plug are removed such that the threads of the plug extend partially into the threads of the fitting. The circuitous path is formed between the threads of the plug and fitting.

BRIEF DESCRIPTION OF THE DRAWINGS

The present disclosure will be described hereafter with reference to the attached drawings which are given as a non-limiting example only, in which:

FIG. 9 is a sectional view of another embodiment of a gas-volume controller in accordance with the present disclosure showing that the gas-volume controller includes a fitting and a plug and suggesting that the plug is pressed into the fitting to engage threads of the plug with an interior surface of the fitting to define a circuitous path between an inlet of the fitting to an outlet;

FIG. 10 is an enlarged view of the gas-volume controller of FIG. 9 showing the plug received in the fitting and the threads of the plug engaged with the interior surface of the fitting to form a seal such that adjacent portions of the circuitous path are separated from one another to force gas to travel around the plug along the circuitous path;

FIG. 20 is a perspective view of a check valve in accordance with the present disclosure showing that the check valve includes a frame and a plunger movable relative to an opening in the frame;

FIG. 21 is a sectional view taken along line 21-21 in FIG. 20;

Figure 1:
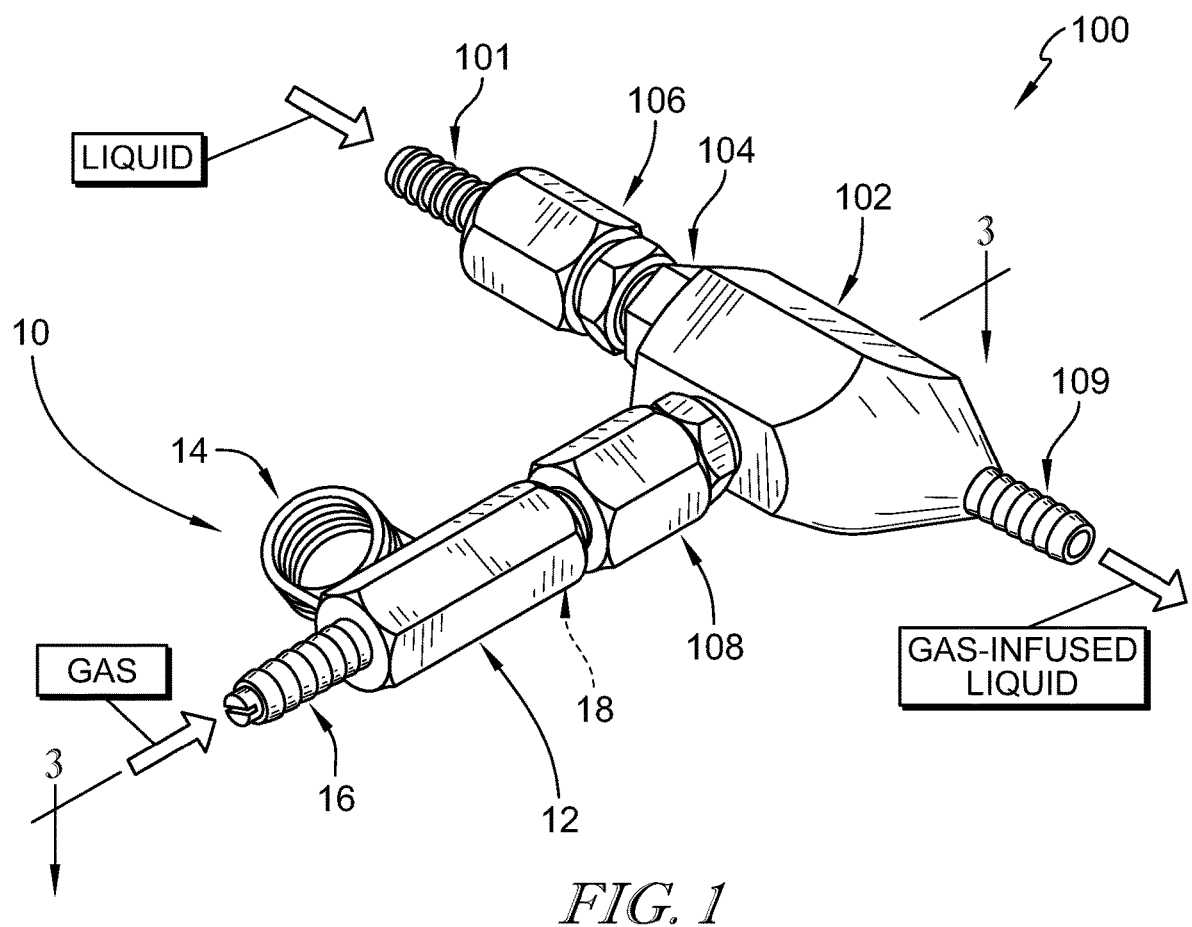
FIG. 1 is a perspective view of a gas infuser in accordance with the present disclosure showing that the gas infuser includes a mixing chamber, a liquid injector, and a gas-volume controller and suggesting that liquid is supplied to the mixing chamber through the injector and gas is supplied to the mixing chamber through the gas-volume controller for mixing with the liquid and forming a gas-infused liquid.

The exemplification set out herein illustrates embodiments of the disclosure that are not to be construed as limiting the scope of the disclosure in any manner Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

The term beverage as may be used herein is intended to be broadly defined as including, but not limited to, brewed beverages such as coffee and tea, juices, and diluted concentrates of brewed beverages, juices, or other syrups, as well as any other beverages or consumable liquids. The term gas as may be used herein is intended to be broadly defined as including, but not limited to, oxygen, air, carbon dioxide ($CO_2$), nitrogen ($N_2$), as well as any other gaseous substance. The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

Figure 2:
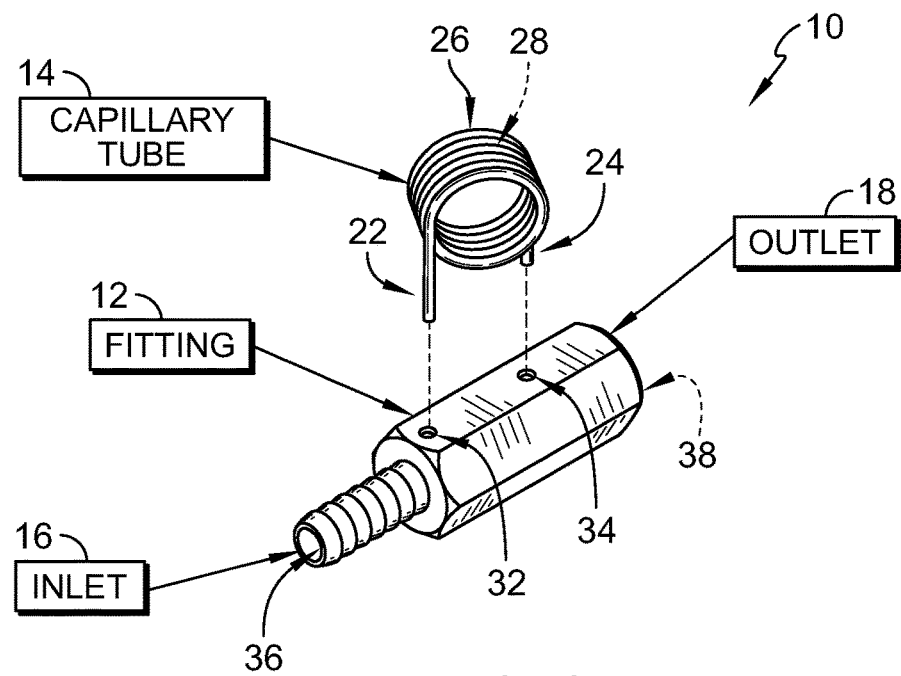
FIG. 2 is an exploded assembly view of the gas-volume controller of FIG. 1 showing that the gas-volume controller includes a fitting having an inlet and an outlet and a capillary tube coupled to the fitting and suggesting that the capillary tube controls a volume of gas that passes from the inlet to the outlet of the fitting substantially independent of pressure fluctuations of the gas at the inlet.
Figure 3:
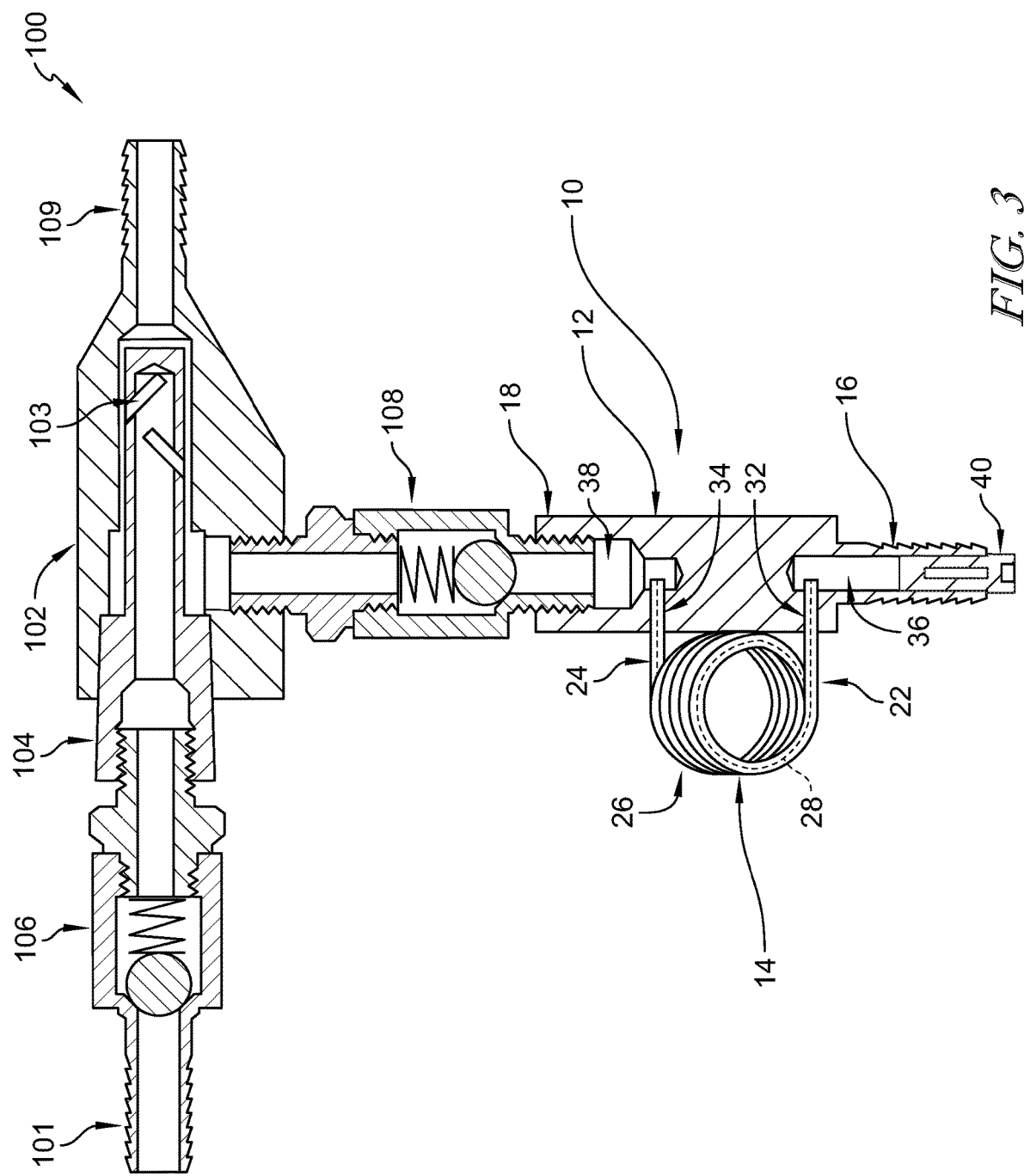
FIG. 3 is a sectional view taken along line 3-3 in FIG. 1 showing that the capillary tube includes a coil and stems extending from opposing ends of the coil with one stem positioned in an opening associated with the inlet of the fitting and the other stem positioned in an opening associated with the outlet and suggesting that a circuitous path is formed through the stems and coil to direct gas from the inlet to the outlet.

A gas infuser 100 in accordance with the present disclosure is shown in FIG. 1. Gas infuser 100 includes a mixing chamber 102 and a liquid injector 104 coupled to mixing chamber 102. A check valve 106 is coupled to injector 104 and provides an inlet 101 for passing a liquid through injector 104 into mixing chamber 102. In the illustrative embodiment, a gas-volume controller 10 in accordance with the present disclosure is coupled to mixing chamber 102 to control a volume of gas delivered to mixing chamber 102. Gas-volume controller 10 includes a fitting 12 having an elongate structure and a capillary tube 14 coupled to fitting 12 as shown in FIGS. 1 and 2. Fitting 12 has an inlet 16 and an outlet 18 at opposite ends of the elongate structure as shown in FIGS. 1-3. Outlet 18 is coupled to check valve 108.

Injector 104 is received in mixing chamber 102 and includes a plurality of slots 103 to allow liquid to pass through injector 104 into mixing chamber 102 as suggested in FIG. 3. A liquid, such as water or pre-formed beverage for example, passes from inlet 101 through check valve 106 and injector 104 into mixing chamber 102 as suggested in FIG. 1. A gas, such as $CO_2$ or $N_2$, passes from inlet 16 through capillary tube 14 to outlet 18 and through check valve 108 into mixing chamber 102. The liquid and gas are forced together in mixing chamber 102 to form a gas-infused liquid that passes out of mixing chamber 102 through outlet 109. In some embodiments, the gas-infused liquid is a beverage or used in the making of a beverage.

Capillary tube 14 includes a coil 26 and stems 22, 22 extending from opposing ends of coil 26 as shown in FIGS. 2 and 3. A circuitous path 28 is formed through coil 26 and stems 22, 24 of capillary tube 14. Fitting 12 is formed to include openings 32, 34. Opening 32 extends into a cavity 36 of inlet 16 and opening 34 extends into a cavity 38 of outlet 18 as shown in FIG. 3. Cavities 36, 38 are separated from one another in fitting 12. Stem 22 of capillary tube 14 is positioned in opening 32 of fitting 12 and stem 24 is positioned in opening 34 as shown in FIG. 3. Gas is supplied into cavity 36 of inlet 16 and passes through circuitous path 28 of capillary tube 14 to cavity 38 of outlet 18. In some embodiments, a filter 40 is coupled to inlet 16 as shown in FIG. 3. Filter 40 is porous to allow the gas to pass through filter 40.

Capillary tube 14 controls a volume of gas delivered from cavity 36 to cavity 38 substantially independent of pressure fluctuations of the gas in cavity 36. The relatively small diameter and long length of circuitous path 28 regulates the amount of gas that can pass from cavity 36 to cavity 38. The diameter and length of circuitous path 28 can be adjusted to adjust the volume (or flow rate) of gas that passes through gas-volume controller 10. In some embodiments, one gas-volume controller 10 can be exchanged for another gas-volume controller 10 having a different configuration to allow a different volume of gas to be supplied to mixing chamber 102. In some embodiments, one gas-volume controller 10 can be exchanged for another gas-volume controller 10 of the same configuration for replacement.

Gas-volume controller 10 provides an inexpensive way to regulate gas volume delivered to mixing chamber 102. Gas-volume controller 10 is easily replaceable and exchangeable. Regulating gas flow into mixing chamber 102 maximizes consistency of the gas-infused liquid being formed by gas infuser 100. In some embodiments, no check valves are used in gas infuser 100, and inlet 101 is formed on injector 104 and gas-volume controller 10 is coupled directly to mixing chamber 102. In some embodiments, a liquid-volume controller similar to gas-volume controller 10 is used to regulate liquid volume delivered to mixing chamber 102 through inlet 101. In some embodiments, a gas-infused liquid-volume controller similar to gas-volume controller 10 is used to regulate gas-infused liquid volume exiting mixing chamber 102 through outlet 109.

Figure 4:
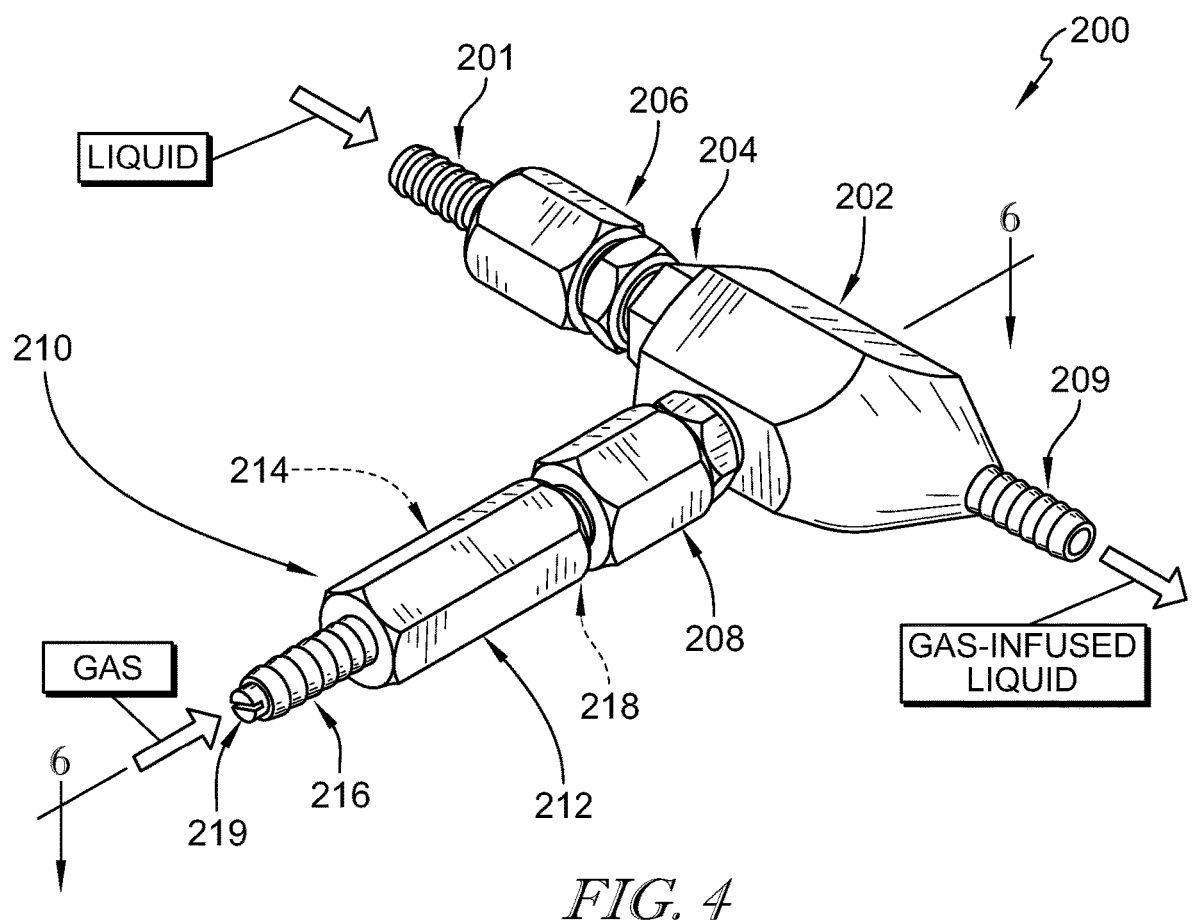
FIG. 4 is a perspective view of another embodiment of a gas infuser in accordance with the present disclosure showing that the gas infuser includes a mixing chamber, a liquid injector, and a gas-volume controller and suggesting that liquid is supplied to the mixing chamber through the injector and gas is supplied to the mixing chamber through the gas-volume controller for mixing with the liquid and forming a gas-infused liquid.
Figure 5:
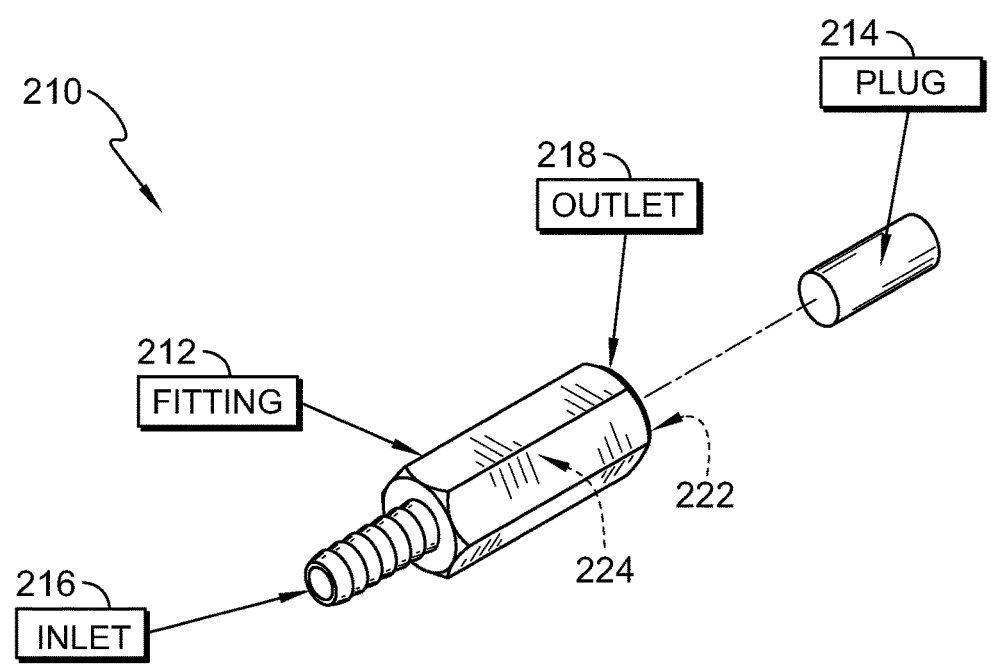
FIG. 5 is an exploded assembly view of the gas-volume controller of FIG. 4 showing that the gas-volume controller includes a fitting having an inlet and an outlet and a plug coupled to the fitting and suggesting that the plug engages with threads of an internal cavity of the fitting, as shown in FIG. 6, to form a circuitous path from the inlet to the outlet that controls a volume of gas that passes through the gas-volume controller substantially independent of pressure fluctuations of the gas at the inlet.

Another embodiment of a gas infuser 200 in accordance with the present disclosure is shown in FIG. 4. Gas infuser 200 includes a mixing chamber 202 and a liquid injector 204 coupled to mixing chamber 202. A check valve 206 is coupled to injector 204 and provides an inlet 201 for passing a liquid through injector 204 into mixing chamber 202. In the illustrative embodiment, a gas-volume controller 210 in accordance with the present disclosure is coupled to mixing chamber 202 to control a volume of gas delivered to mixing chamber 202. Gas-volume controller 210 includes a fitting 212 and a plug 214 coupled to fitting 212 as shown in FIG. 5. Fitting 212 has an inlet 216 and an outlet 218, and outlet 218 is coupled to check valve 208. Plug 214 is received in a cavity 222 of fitting 212 and engages with threads 224 to form a circuitous path between inlet 216 to outlet 218 as suggested in FIGS. 6-8.

Figure 6:
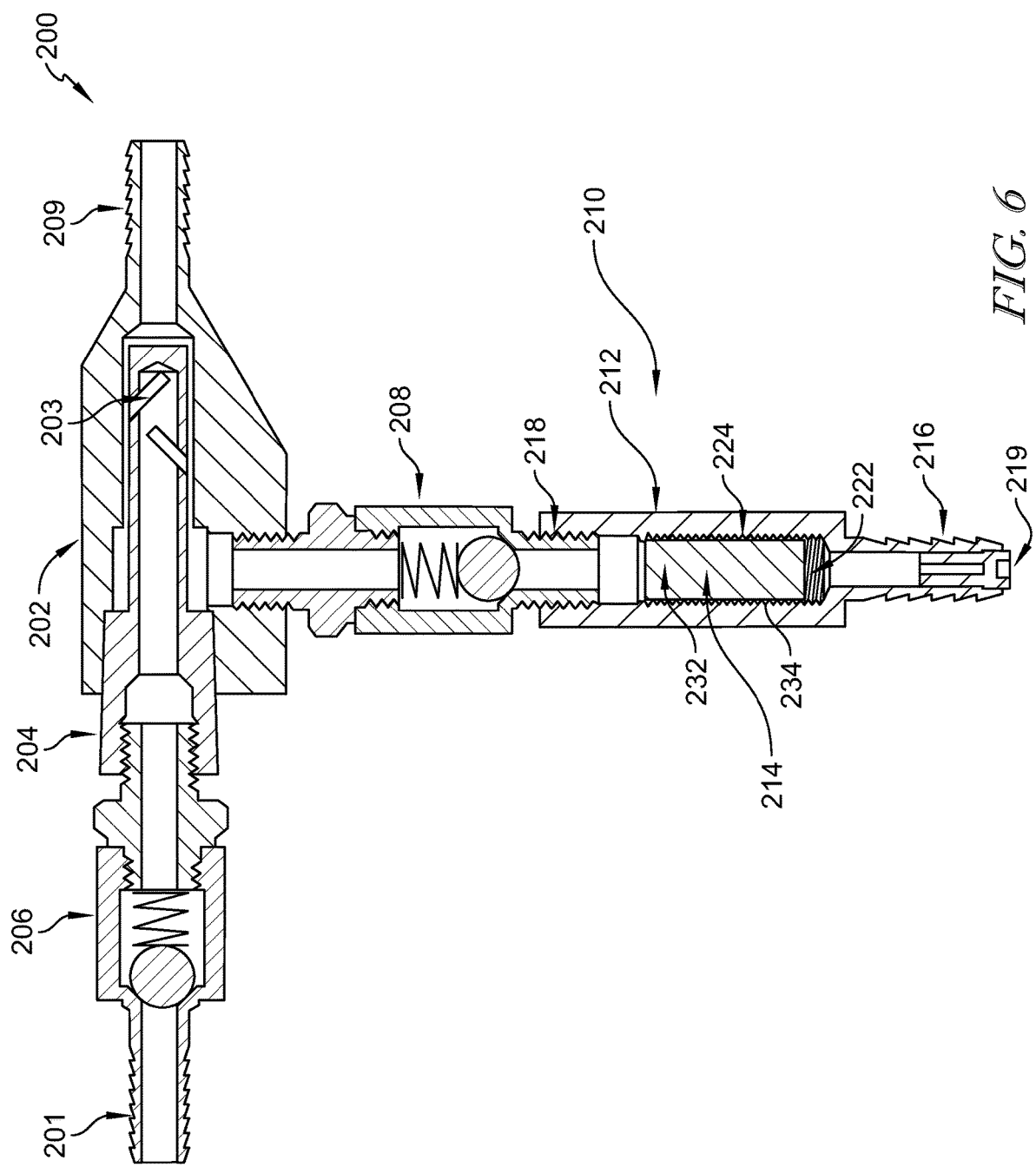
FIG. 6 is a sectional view taken along line 6-6 in FIG. 4 showing the plug received in the fitting such that the inlet is separated from the outlet and suggesting that gas enters the inlet and flows along the threads around the plug to the outlet.

Injector 204 is received in mixing chamber 202 and includes a plurality of slots 203 to allow liquid to pass through injector 204 into mixing chamber 202 as suggested in FIG. 6. A liquid, such as water or pre-formed beverage for example, passes from inlet 201 through check valve 206 and injector 204 into mixing chamber 202 as suggested in FIG. 4. A gas, such as $CO_2$ or $N_2$, passes from inlet 216 through the circuitous path defined between fitting 212 and plug 214 to outlet 218 and through check valve 208 into mixing chamber 202. The liquid and gas are forced together in mixing chamber 202 to form a gas-infused liquid that passes out of mixing chamber 202 through outlet 209. In some embodiments, the gas-infused liquid is a beverage or used in the making of a beverage.

Figure 7:
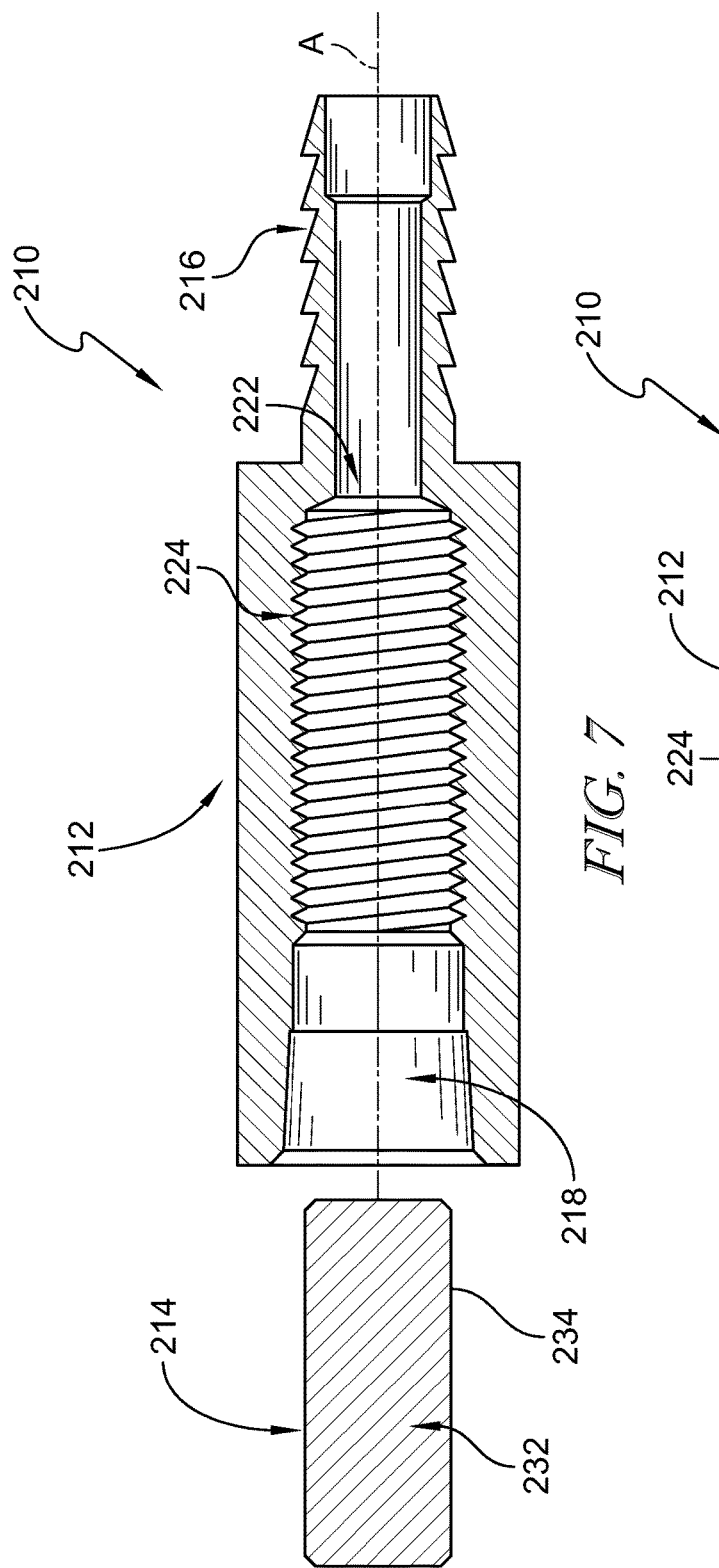
FIG. 7 is a sectional view of the gas-volume controller of FIG. 6 showing the plug aligned with the fitting and suggesting that the plug is pressed into the fitting to engage with the threads to define the circuitous path between the fitting and the plug.
Figure 8:
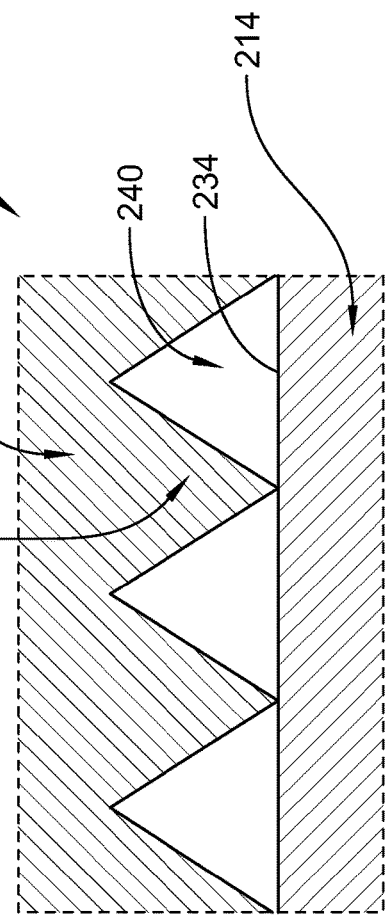
FIG. 8 is an enlarged view of the gas-volume controller of FIG. 6 showing the threads of the fitting engaged with the exterior surface of the plug to form a seal such that adjacent portions of the circuitous path are separated from one another to force the gas to travel around the plug along the circuitous path.

Plug 214 includes a body 232 and an exterior surface 234 as shown in FIG. 7. Plug 214 is sized such that exterior surface 234 engages with threads 224 when plug 214 is received in cavity 222 of fitting 212. In the illustrative embodiment, threads 224 are helical. Plug 214 is pressed into cavity 222 along an axis A. Body 232 separates inlet 216 from outlet 218 when received in cavity 222. A circuitous path 240 is formed along threads 224 between fitting 212 and plug 214 as suggested in FIG. 8. Threads 224 engage with exterior surface 234 to form a seal such that adjacent portions of the circuitous path 240 are separated from one another to force the gas supplied to inlet 216 to pass along circuitous path 240 to outlet 218. In some embodiments, a filter 219 is coupled to inlet 216 as shown in FIG. 6. Filter 219 is porous to allow the gas to pass through filter 219.

Circuitous path 240 controls a volume of gas delivered from inlet 216 to outlet 218 substantially independent of pressure fluctuations of the gas at inlet 216. The relatively small diameter and long length of circuitous path 240 regulates the amount of gas that can pass from inlet 216 to outlet 218. The diameter and length of circuitous path 240 can be adjusted to adjust the volume (or flow rate) of gas that passes through gas-volume controller 210. In some embodiments, one gas-volume controller 210 can be exchanged for another gas-volume controller 210 having a different configuration to allow a different volume of gas to be supplied to mixing chamber 202. In some embodiments, one gas-volume controller 210 can be exchanged for another gas-volume controller 210 of the same configuration for replacement.

Gas-volume controller 210 provides an inexpensive way to regulate gas volume delivered to mixing chamber 202. Gas-volume controller 210 is easily replaceable and exchangeable. Regulating gas flow into mixing chamber 202 maximizes consistency of the gas-infused liquid being formed by gas infuser 200. In some embodiments, no check valves are used in gas infuser 200, and inlet 201 is formed on injector 204 and gas-volume controller 210 is coupled directly to mixing chamber 202. In some embodiments, a liquid-volume controller similar to gas-volume controller 210 is used to regulate liquid volume delivered to mixing chamber 202 through inlet 201. In some embodiments, a gas-infused liquid-volume controller similar to gas-volume controller 210 is used to regulate gas-infused liquid volume exiting mixing chamber 202 through outlet 209.

Another embodiment of a gas-volume controller 310 in accordance with the present disclosure is shown in FIG. 9. Gas-volume controller 310 is similar to gas-volume controller 210 shown in FIGS. 4-8, and includes a fitting 312 and a plug 314 coupled to fitting 312. Fitting 312 has an inlet 316 and an outlet 318. Plug 314 is received in a cavity 322 of fitting 312 to engage threads 334 with an interior surface 324 to form a circuitous path between inlet 316 to outlet 318 as suggested in FIG. 10.

Plug 314 includes a body 332 and threads 334 extending outward from body 332 as shown in FIG. 9. In the illustrative embodiment, threads 334 are helical. Plug 314 is sized such that threads 334 engage with interior surface 324 when plug 314 is received in cavity 322 of fitting 312. Plug 314 is pressed into cavity 322 along an axis A. Body 332 separates inlet 316 from outlet 318 when received in cavity 322. A circuitous path 340 is formed along threads 334 between fitting 312 and plug 314 as suggested in FIG. 10. Threads 334 engage with interior surface 324 to form a seal such that adjacent portions of the circuitous path 340 are separated from one another to force the gas supplied to inlet 316 to pass along circuitous path 340 to outlet 318. In some embodiments, a liquid-volume controller similar to gas-volume controller 310 is used to regulate liquid volume delivered to mixing chamber 202 through inlet 201. In some embodiments, a gas-infused liquid-volume controller similar to gas-volume controller 310 is used to regulate gas-infused liquid volume exiting mixing chamber 202 through outlet 209.

Figure 11:
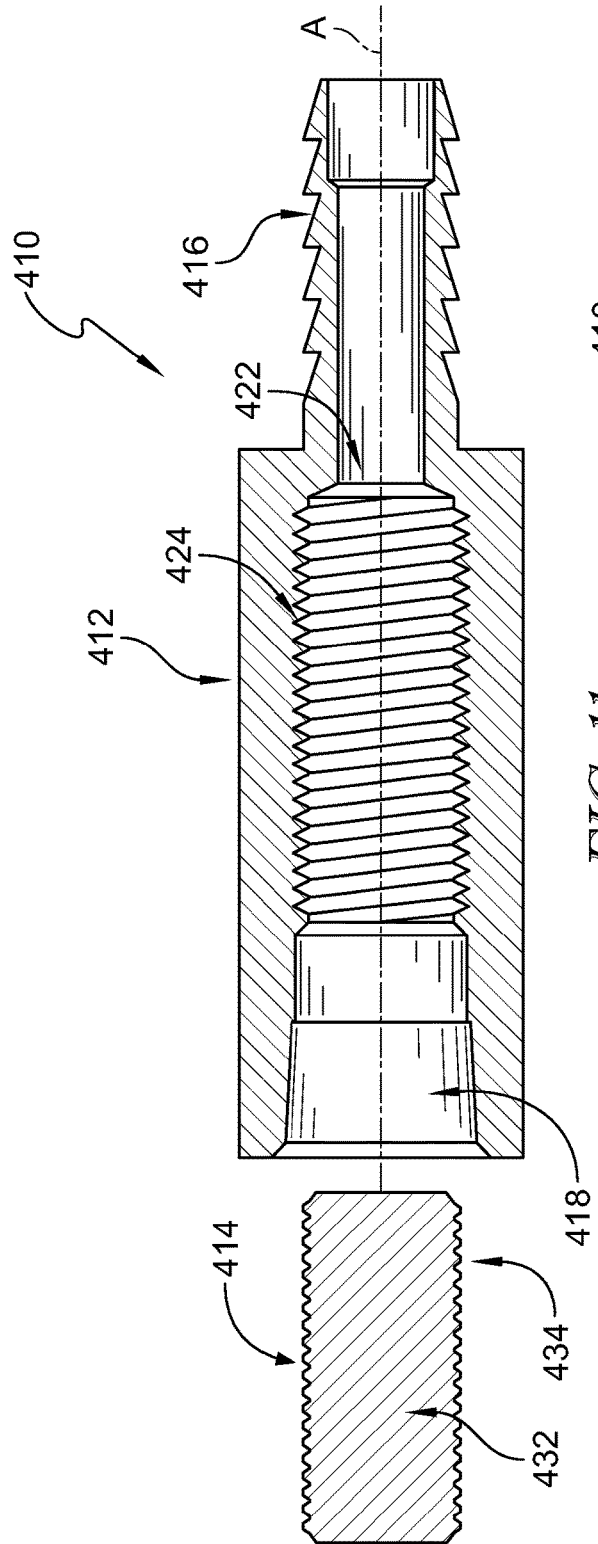
FIG. 11 is a sectional view of another embodiment of a gas-volume controller in accordance with the present disclosure showing that the gas-volume controller includes a fitting and a plug and suggesting that the plug is received in the fitting to engage threads of the plug with threads of the fitting to define a circuitous path between an inlet of the fitting to an outlet.

Another embodiment of a gas-volume controller 410 in accordance with the present disclosure is shown in FIG. 11. Gas-volume controller 410 is similar to gas-volume controller 210 shown in FIGS. 4-8, and includes a fitting 412 and a plug 414 coupled to fitting 412. Fitting 412 has an inlet 416 and an outlet 418. Plug 414 is received in a cavity 422 of fitting 412 to engage threads 434 of plug 414 with threads 424 of fitting 412 to form a circuitous path between inlet 416 to outlet 418 as suggested in FIG. 12.

Plug 414 includes a body 432 and threads 434 extending outward from body 432 as shown in FIG. 11. In the illustrative embodiment, threads 424, 434 are helical. Plug 414 is sized such that threads 434 engage with threads 424 of fitting 412 when plug 414 is received in cavity 422. Plug 414 is rotated to engage threads 424, 434 to drive plug 414 into cavity 422 along an axis A. Body 432 separates inlet 416 from outlet 418 when received in cavity 422.

Figure 12:
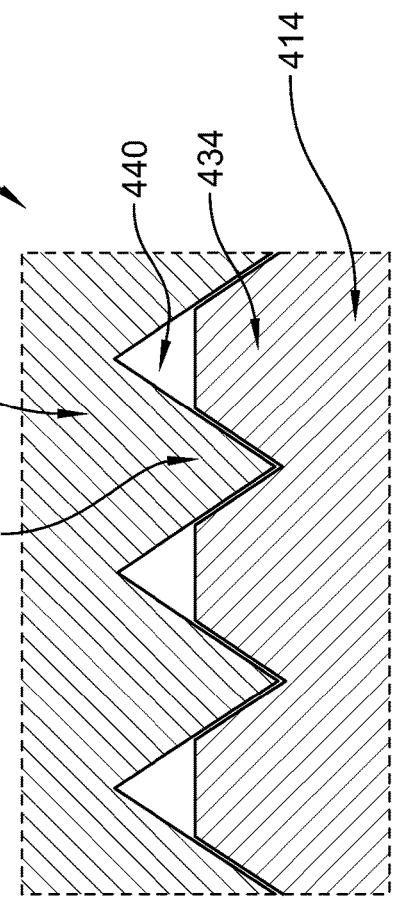
FIG. 12 is an enlarged view of the gas-volume controller of FIG. 11 showing the plug received in the fitting and the threads of the plug engaged with the threads of the fitting to form a seal such that adjacent portions of the circuitous path are separated from one another to force gas to travel around the plug along the circuitous path

A circuitous path 440 is formed along threads 424, 434 between fitting 412 and plug 414 as suggested in FIG. 12. In the illustrative embodiment, threads 434 are shorter relative to threads 424 such that threads 434 extend partially into threads 424. A relative height of threads 424, 434 can be adjusted to adjust a size of circuitous path 440. Threads 424, 434 engage with one another to form a seal such that adjacent portions of circuitous path 440 are separated from one another to force the gas supplied to inlet 416 to pass along circuitous path 440 to outlet 418. In some embodiments, a liquid-volume controller similar to gas-volume controller 410 is used to regulate liquid volume delivered to mixing chamber 202 through inlet 201. In some embodiments, a gas-infused liquid-volume controller similar to gas-volume controller 410 is used to regulate gas-infused liquid volume exiting mixing chamber 202 through outlet 209.

Figure 13:
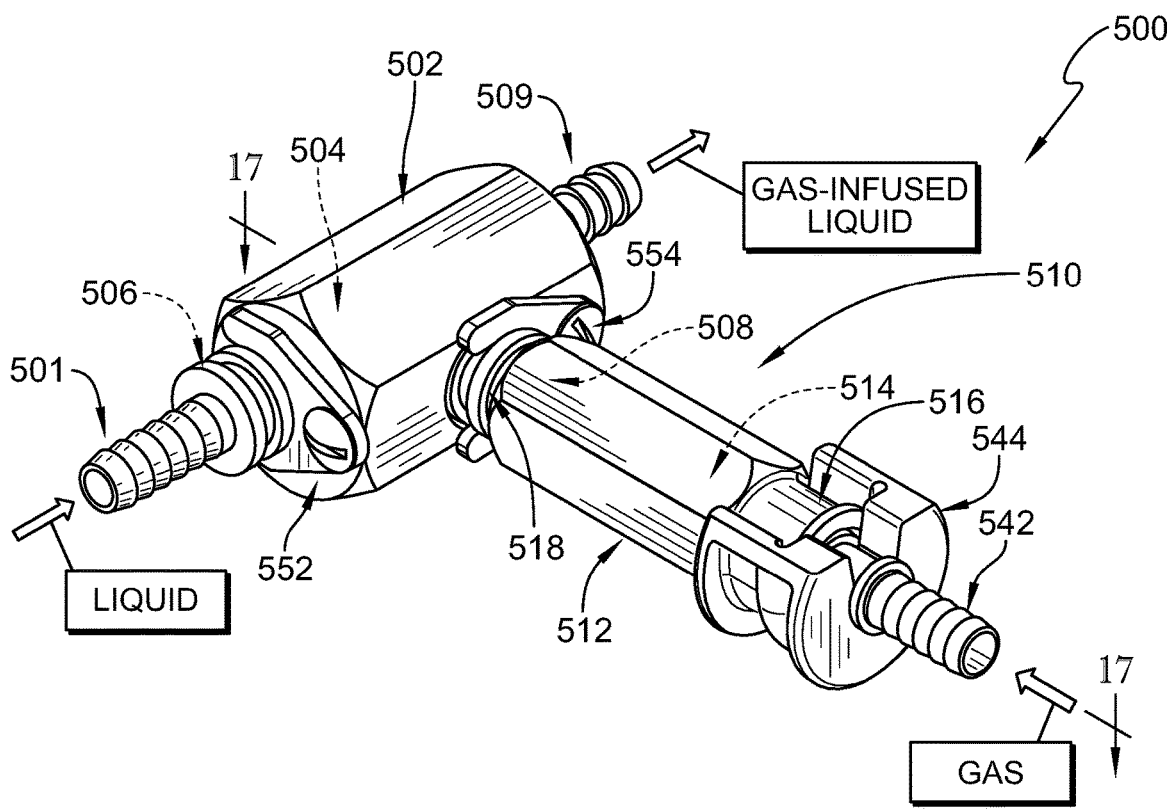
FIG. 13 is a perspective view of another embodiment of a gas infuser in accordance with the present disclosure showing that the gas infuser includes a mixing chamber, a liquid injector, and a gas-volume controller and suggesting that liquid is supplied to the mixing chamber through the injector and gas is supplied to the mixing chamber through the gas-volume controller for mixing with the liquid and forming a gas-infused liquid.

Another embodiment of a gas infuser 500 in accordance with the present disclosure is shown in FIG. 13. Gas infuser 500 includes a mixing chamber 502 and a liquid injector 504 coupled to mixing chamber 502. An inlet 501 is coupled to mixing chamber 502 for passing a liquid through injector 504 into mixing chamber 502. A check valve 506 is coupled to inlet 501. In the illustrative embodiment, a gas-volume controller 510 in accordance with the present disclosure is coupled to mixing chamber 502 to control a volume of gas delivered to mixing chamber 502.

Figure 14:
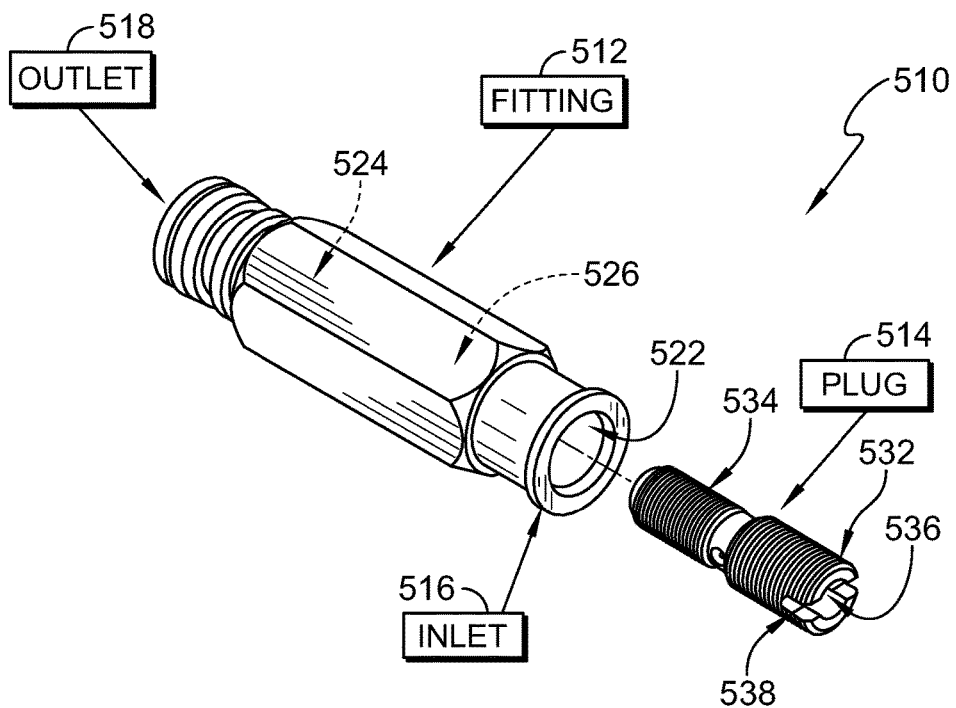
FIG. 14 is an exploded assembly view of the gas-volume controller of FIG. 13 showing that the gas-volume controller includes a fitting having an inlet and an outlet and a plug coupled to the fitting and suggesting that a threaded head of the plug engages with an internal cavity of the fitting, as shown in FIG. 15, to form a circuitous path from the inlet to the outlet that controls a volume of gas that passes through the gas-volume controller substantially independent of pressure fluctuations of the gas at the inlet.

Gas-volume controller 510 includes a fitting 512 and a plug 514 coupled to fitting 512 as suggested in FIGS. 13 and 14. Fitting 512 has an inlet 516 and an outlet 518, and outlet 518 is coupled to mixing chamber 502. A check valve 508 is coupled to outlet 518 of fitting 512. Plug 514 is received in and engages with fitting 512 to form a circuitous path between inlet 516 to outlet 518.

Figure 15:
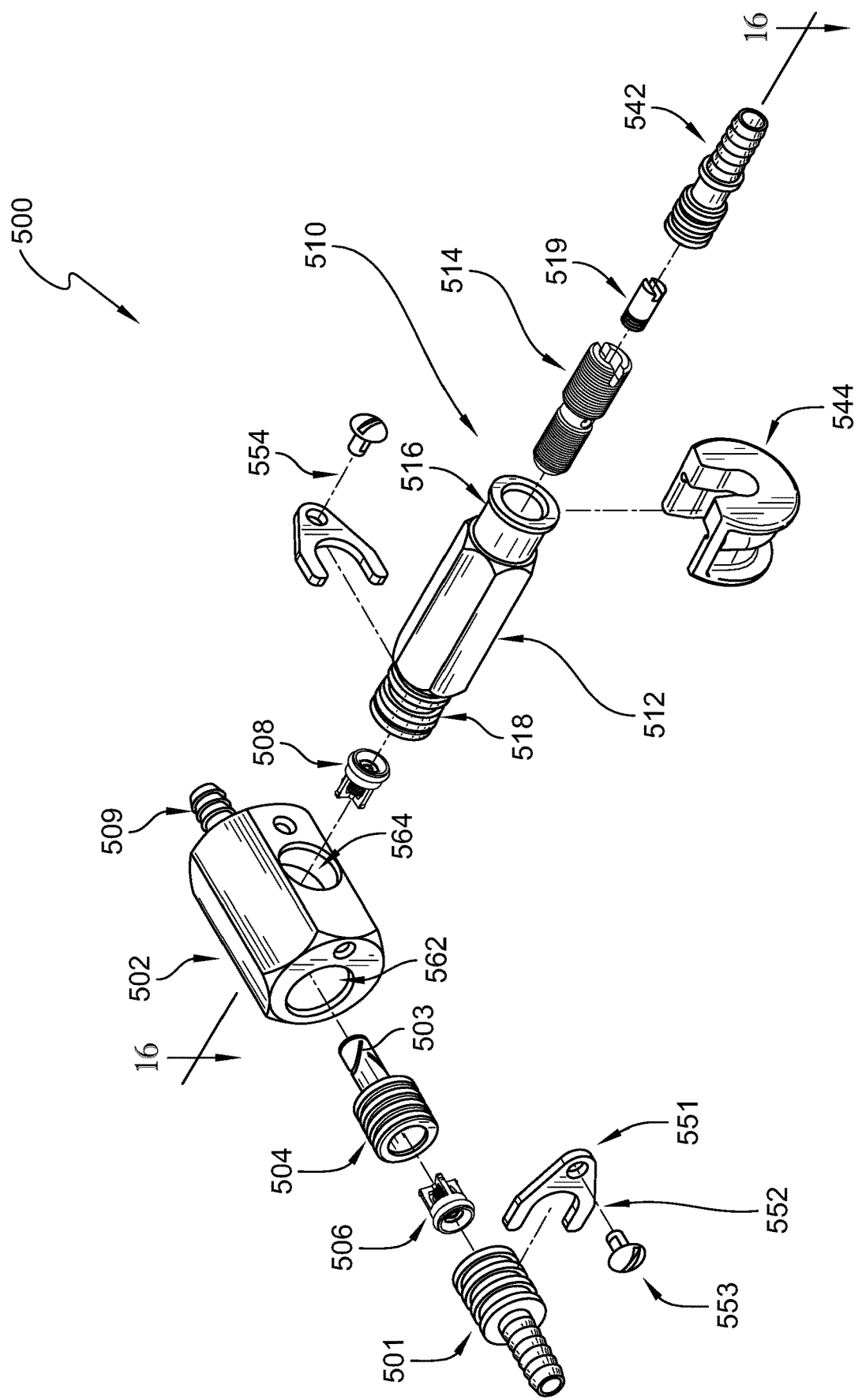
FIG. 15 is an exploded assembly view of the gas infuser of FIG. 13.
Figure 16:
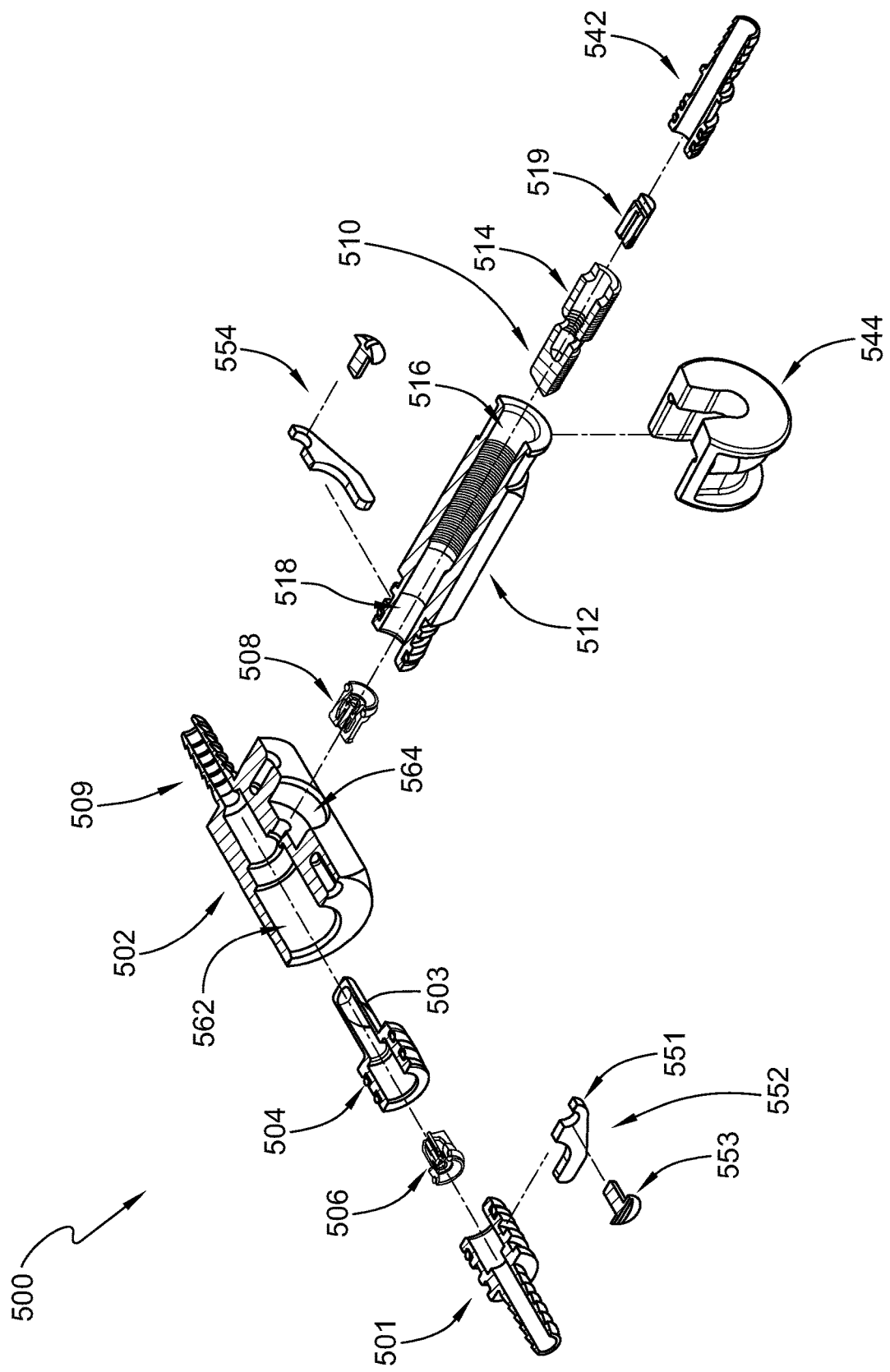
FIG. 16 is a sectional view taken along line 16-16 in FIG. 15.

Injector 504 is received in a cavity 562 of mixing chamber 502 and includes a plurality of slots 503 to allow liquid to pass through injector 504 into mixing chamber 502 as suggested in FIGS. 15 and 16. Inlet 501 is at least partially received in cavity 562 and a clip 552 engages with inlet 501 and mixing chamber 502 to block removal of inlet 501 and injector 504 from cavity 562. Clip 552 includes a holder 551 for engaging with inlet 501 and a fastener 553 for securing holder 551 to mixing chamber 502. Fitting 512 of gas-volume controller 510 is at least partially received in a cavity 564 of mixing chamber 502 that intersects with cavity 562 to allow gas flow through mixing chamber 502 to outlet 509. A clip 554, similar to clip 552, blocks removal of fitting 512 from cavity 564. A connector 542 is received in inlet 516 of fitting 512 and secured in place with a clamp 544.

Figure 17:
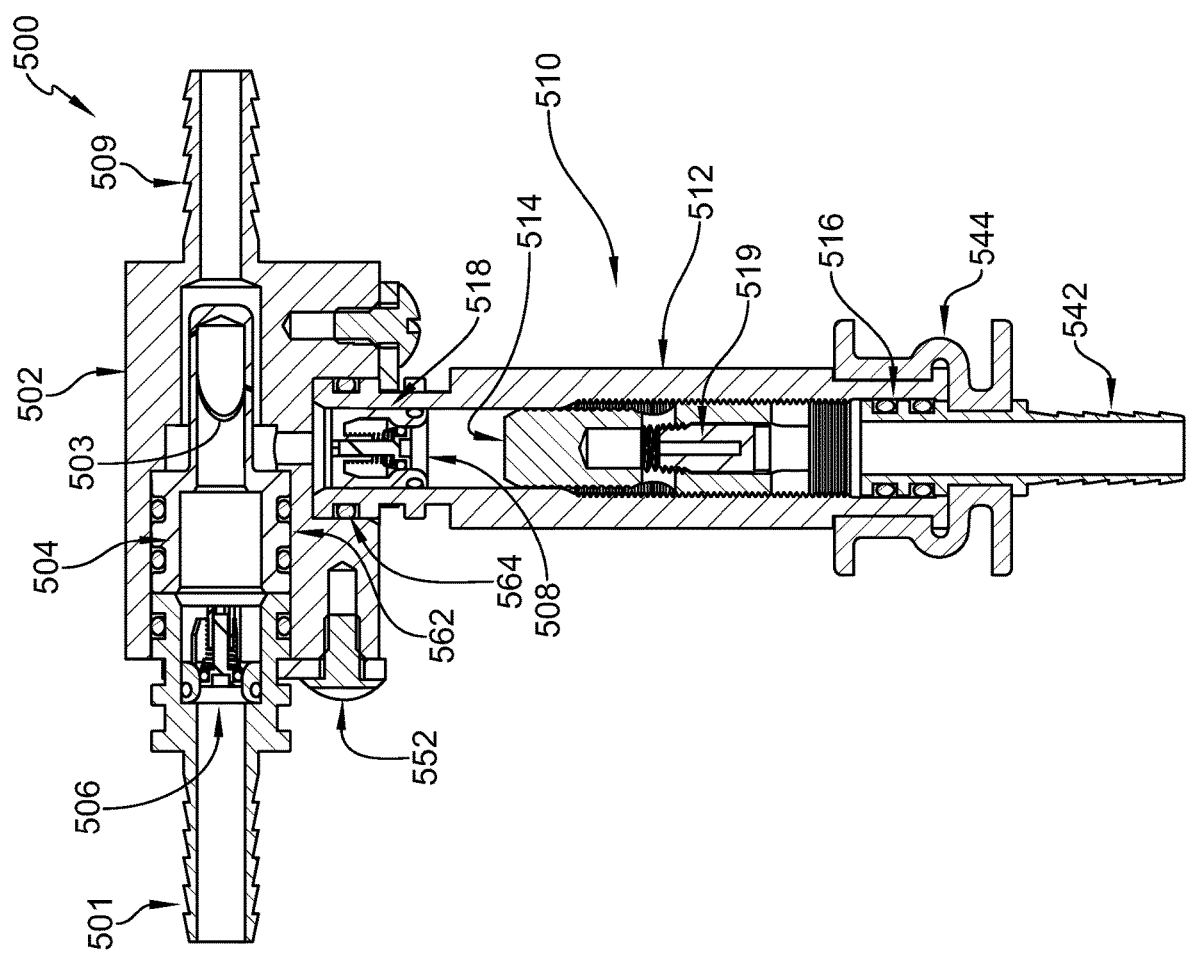
FIG. 17 is a sectional view taken along line 17-17 in FIG. 13 showing the plug received in the fitting such that the inlet is separated from the outlet and suggesting that gas enters the inlet and flows along the threads around the plug to the outlet.

A liquid, such as water or pre-formed beverage for example, passes from inlet 501 through check valve 506 and injector 404 into mixing chamber 502 as suggested in FIG. 17. A gas, such as $CO_2$ or $N_2$, passes from connector 542 through inlet 516 and the circuitous path defined between fitting 512 and plug 514 to outlet 518, and through check valve 508, into mixing chamber 502. The liquid and gas are forced together in mixing chamber 502 to form a gas-infused liquid that passes out of mixing chamber 502 through outlet 509. In some embodiments, the gas-infused liquid is a beverage or used in the making of a beverage.

Figure 18:
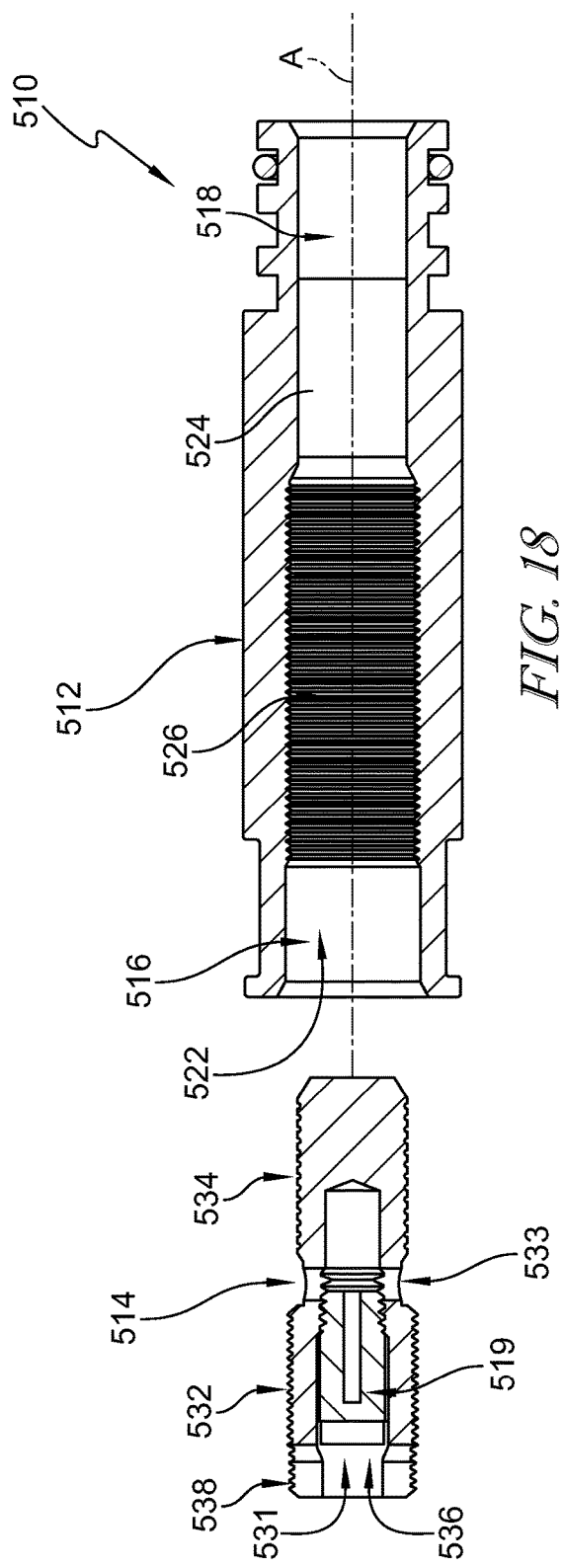
FIG. 18 is a sectional view of the gas-volume controller of FIG. 17 showing the plug aligned with the fitting and suggesting that the plug is received in the fitting to engage the threads of the head of the plug with an inner surface of the cavity to define the circuitous path between the fitting and the plug.

Plug 514 includes a body 532 and a head 534 coupled to body 532 as shown in FIGS. 14 and 18. A passage 536 is formed in plug 514 to allow gas to flow through body 532 and around head 534. Passage 536 includes a bore 531 extending axially through body 532 and a bore 533 extending through plug 514 between body 532 and head 534. In some embodiments, a filter 519 is received in bore 531 as shown in FIG. 18. Filter 519 is porous to allow the gas to pass through filter 519.

Figure 19:
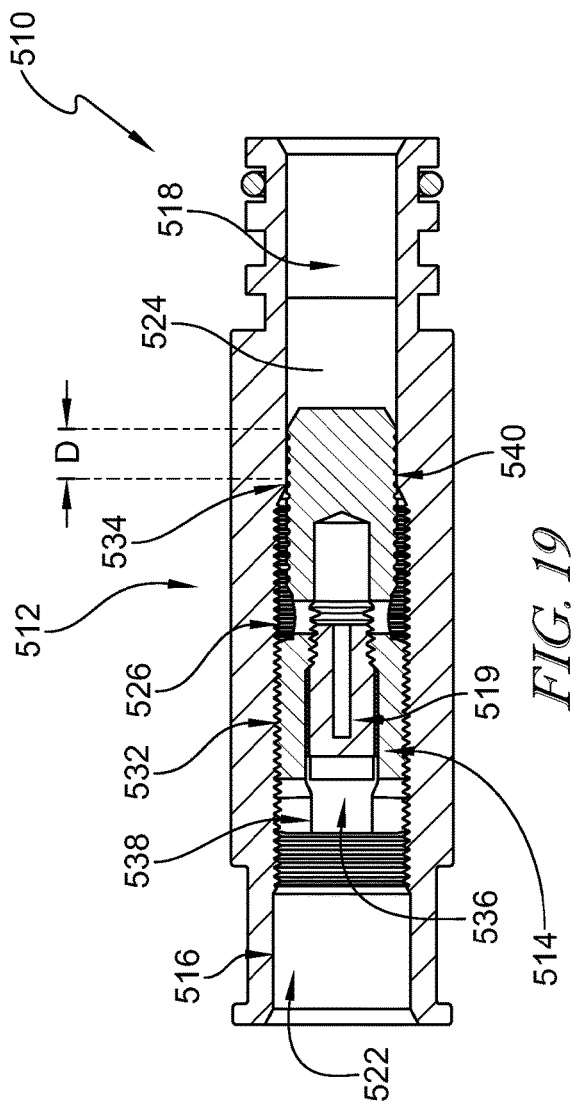
FIG. 19 is a view similar to FIG. 18 showing the plug received in the fitting and suggesting that a depth (D) of the plug relative to the fitting defines a length of the circuitous path and that the depth is adjustable a the selection of a user.

A cavity 522 is formed through fitting 512 defining inlet 516 and outlet 518 as suggested in FIGS. 14 and 18. Threads on body 532 of plug 514 engage with internal threads 526 of cavity 522 to position plug 514 relative to fitting 512 as suggested in FIGS. 18 and 19. Threads on head 534 of plug 514 engage with an interior surface 524 of fitting 512 to define the circuitous path. In the illustrative embodiment, a tool slot 538 allows a user to engage with plug 514 to adjust a depth D of head 534 relative to interior surface 524.

Adjustment of depth D adjusts a length of the circuitous path for setting a volume rate of gas that can pass from inlet 516 to outlet 518. Body 532 engages with threads 526 to block gas from passing around body 532. Gas flows from inlet 516 through passage 536 and around head 534 along the circuitous path defined between head 534 and interior surface 524 toward outlet 518. In the illustrative embodiment, the threads on head 534 are helical.

The circuitous path controls a volume of gas delivered from inlet 516 to outlet 518 substantially independent of pressure fluctuations of the gas at inlet 516. The relatively small diameter and long length of the circuitous path regulates the amount of gas that can pass from inlet 516 to outlet 518. The diameter and length of the circuitous path can be adjusted to adjust the volume (or flow rate) of gas that passes through gas-volume controller 510. In some embodiments, one gas-volume controller 510 can be exchanged for another gas-volume controller 510 having a different configuration to allow a different volume of gas to be supplied to mixing chamber 502. In some embodiments, one gas-volume controller 510 can be exchanged for another gas-volume controller 510 of the same configuration for replacement.

Gas-volume controller 510 provides an inexpensive way to regulate gas volume delivered to mixing chamber 502. Gas-volume controller 510 is easily replaceable and exchangeable. Regulating gas flow into mixing chamber 502 maximizes consistency of the gas-infused liquid being formed by gas infuser 500. In some embodiments, no check valves are used in gas infuser 500. In some embodiments, a liquid-volume controller similar to gas-volume controller 510 is used to regulate liquid volume delivered to mixing chamber 502 through inlet 501. In some embodiments, a gas-infused liquid-volume controller similar to gas-volume controller 510 is used to regulate gas-infused liquid volume exiting mixing chamber 502 through outlet 509.

An embodiment of a check valve 508 in accordance with the present disclosure is shown in FIGS. 20 and 21. Check valve 508 includes a frame 572 and a plunger 574 coupled to frame 572. Plunger 574 is biased by a spring 576 toward a hole 578 formed through frame 572. Plunger 574 is movable relative to frame 572 toward and away from hole 578. A gasket 575 carried on plunger 574 seals against hole 578 in a closed position. A gasket 573 seals against a mating component of check valve 508, such as fitting 512. Flexible grips 571 formed on frame 572 position check valve 508 relative to the mating component. In some embodiments, check valve 506 is formed similar to check valve 508.

Figure 22:
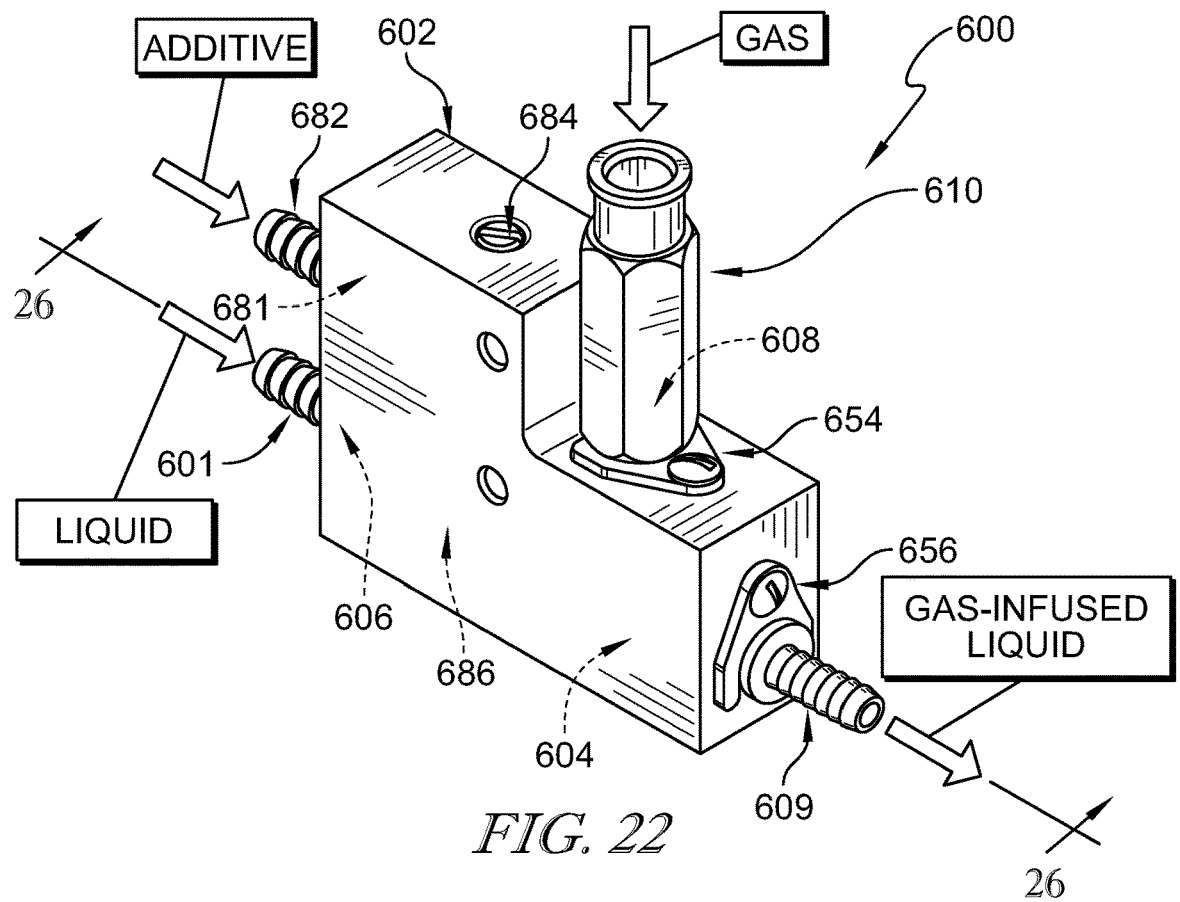
FIG. 22 is a front perspective view of another embodiment of a gas infuser in accordance with the present disclosure showing that the gas infuser includes a mixing chamber, liquid injectors, and a gas-volume controller and suggesting that liquid is supplied to the mixing chamber through a first injector for mixing of the liquid with an additive and gas is supplied to the mixing chamber through the gas-volume controller for mixing with the liquid-additive solution provided through a second injector to form a gas-infused liquid.
Figure 23:
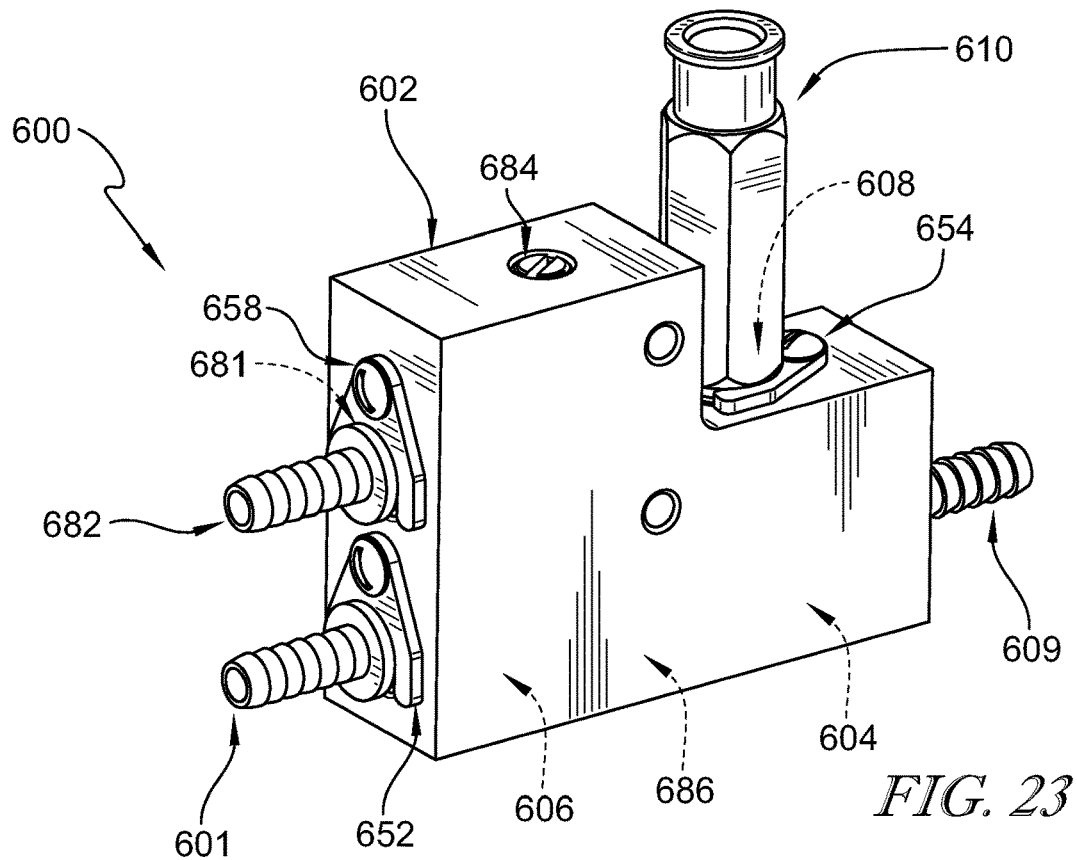
FIG. 23 is a rear perspective view of the gas infuser of FIG. 22.

Another embodiment of a gas infuser 600 in accordance with the present disclosure is shown in FIGS. 22 and 23. Gas infuser 600 includes a mixing chamber 602 and injectors 604, 686 coupled to mixing chamber 602. A liquid inlet 601 is coupled to mixing chamber 602 for passing a liquid through injector 686 into mixing chamber 602. A check valve 606 is coupled to liquid inlet 601. An additive inlet 682 is coupled to mixing chamber 602 for passing an additive into mixing chamber 602 for combination with the liquid to form a liquid-additive solution. A check valve 681 is coupled to additive inlet 682. The liquid-additive solution passes through injector 604 for mixing with a gas in mixing chamber 602. In the illustrative embodiment, a gas-volume controller 610 in accordance with the present disclosure is coupled to mixing chamber 602 to control a volume of gas delivered to mixing chamber 602.

Figure 24:
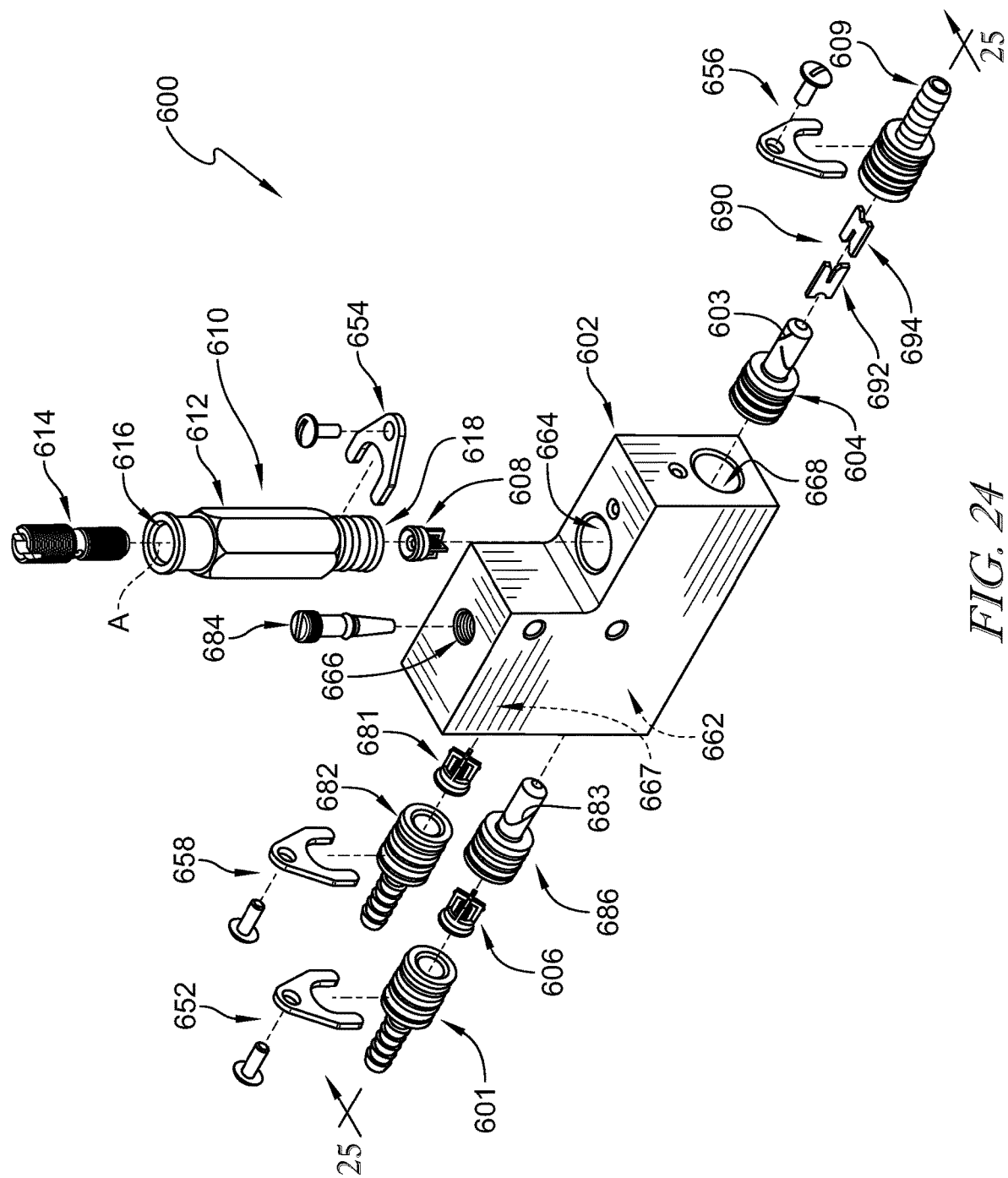
FIG. 24 is an exploded assembly view of the gas infuser of FIG. 22.

Gas-volume controller 610 is similar to gas-volume controller 510 shown in FIGS. 13-19, and includes a fitting 612 and a plug 614 coupled to fitting 612 as suggested in FIGS. 22 and 24. Fitting 612 has an inlet 616 and an outlet 618, and outlet 618 is coupled to mixing chamber 602. A check valve 608 is coupled to outlet 618 of fitting 612. Plug 614 is received in and engages with fitting 612 to form a circuitous path between inlet 616 to outlet 618.

Figure 25:
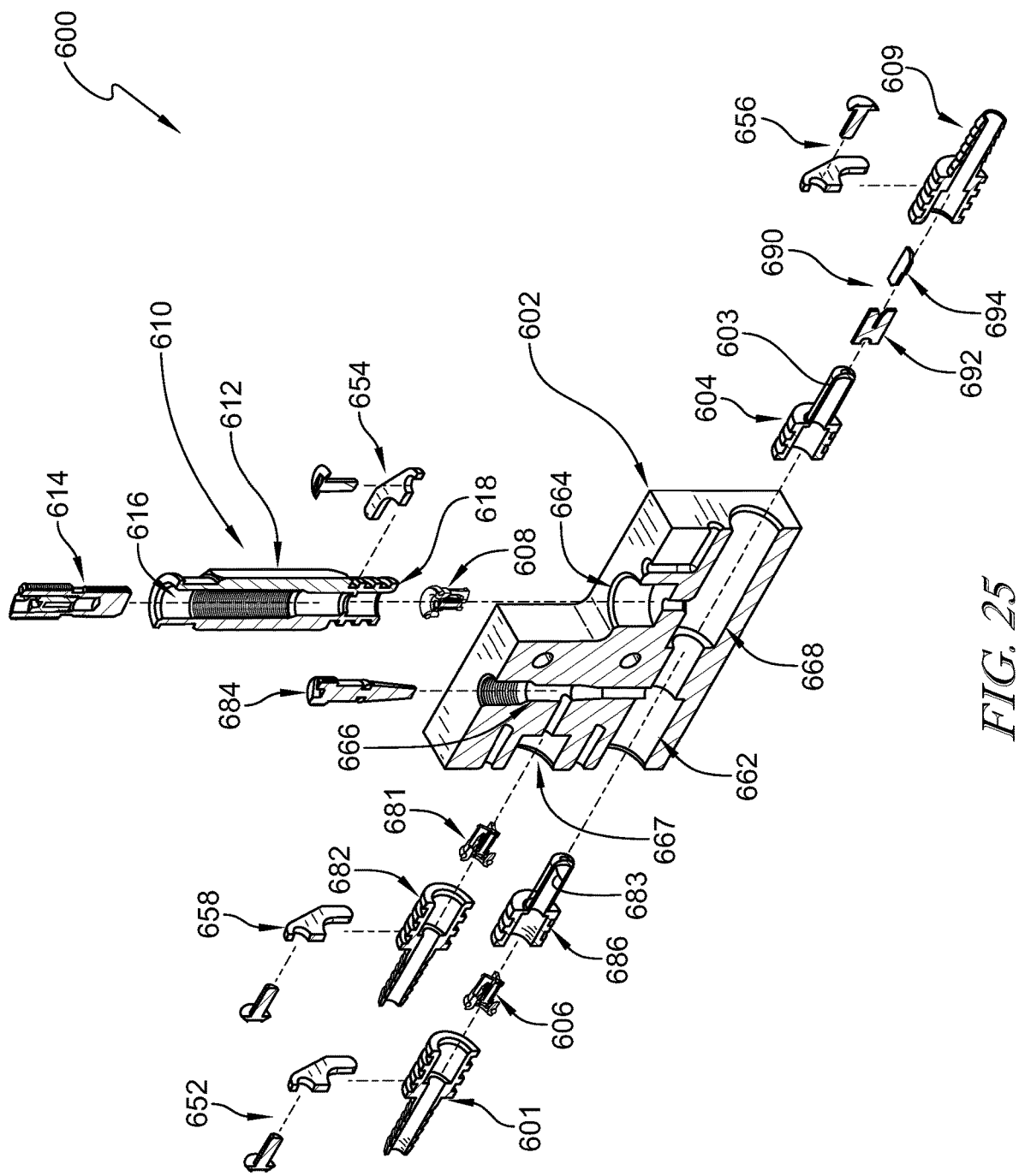
FIG. 25 is a sectional view taken along line 25-25 in FIG. 24 showing that the mixing chamber includes a plurality of intersecting cavities for directing the flow of liquid, additive, and gas toward an outlet of the gas infuser.

Injector 686 is received in a cavity 662 of mixing chamber 602 and includes a plurality of slots 683 to allow liquid to pass through injector 686 into mixing chamber 602 as suggested in FIGS. 24 and 25. Liquid inlet 601 is at least partially received in cavity 662 and a clip 652, similar to clip 552 shown in FIG. 15, engages with liquid inlet 601 and mixing chamber 602 to block removal of liquid inlet 601 and injector 686 from cavity 662. Additive inlet 682 is at least partially received in a cavity 667 of mixing chamber 602 and a clip 658, similar to clip 552 shown in FIG. 15, engages with additive inlet 682 and mixing chamber 602 to block removal of additive inlet 682 from cavity 667. Cavity 667 is connected to cavity 662 by a cavity 666. A flow adjuster 684 extends into cavity 666 to control an amount of additive flowing into cavity 662 for mixing with the liquid.

Cavity 662 of mixing chamber 602 extends into a cavity 668 to allow passage of the liquid-additive solution toward outlet 609 as suggested in FIGS. 24 and 25. Injector 604 is received in cavity 668 and includes a plurality of slots 603 to allow the liquid-additive solution to pass through injector 604. Outlet 609 is at least partially received in cavity 668 and a clip 656, similar to clip 552 shown in FIG. 15, engages with outlet 609 and mixing chamber 602 to block removal of outlet 609 and injector 604 from cavity 668. In the illustrative embodiment, a spacer 690 including two interlocking plates 692, 694 is received in outlet 609 and configured to engage with injector 604 to block movement of injector 604 toward outlet 609. Fitting 612 of gas-volume controller 610 is at least partially received in a cavity 664 of mixing chamber 602 that intersects with cavity 668 to allow gas flow through mixing chamber 602 to outlet 609. A clip 654, similar to clip 552 shown in FIG. 15, blocks removal of fitting 612 from cavity 664.

Figure 26:
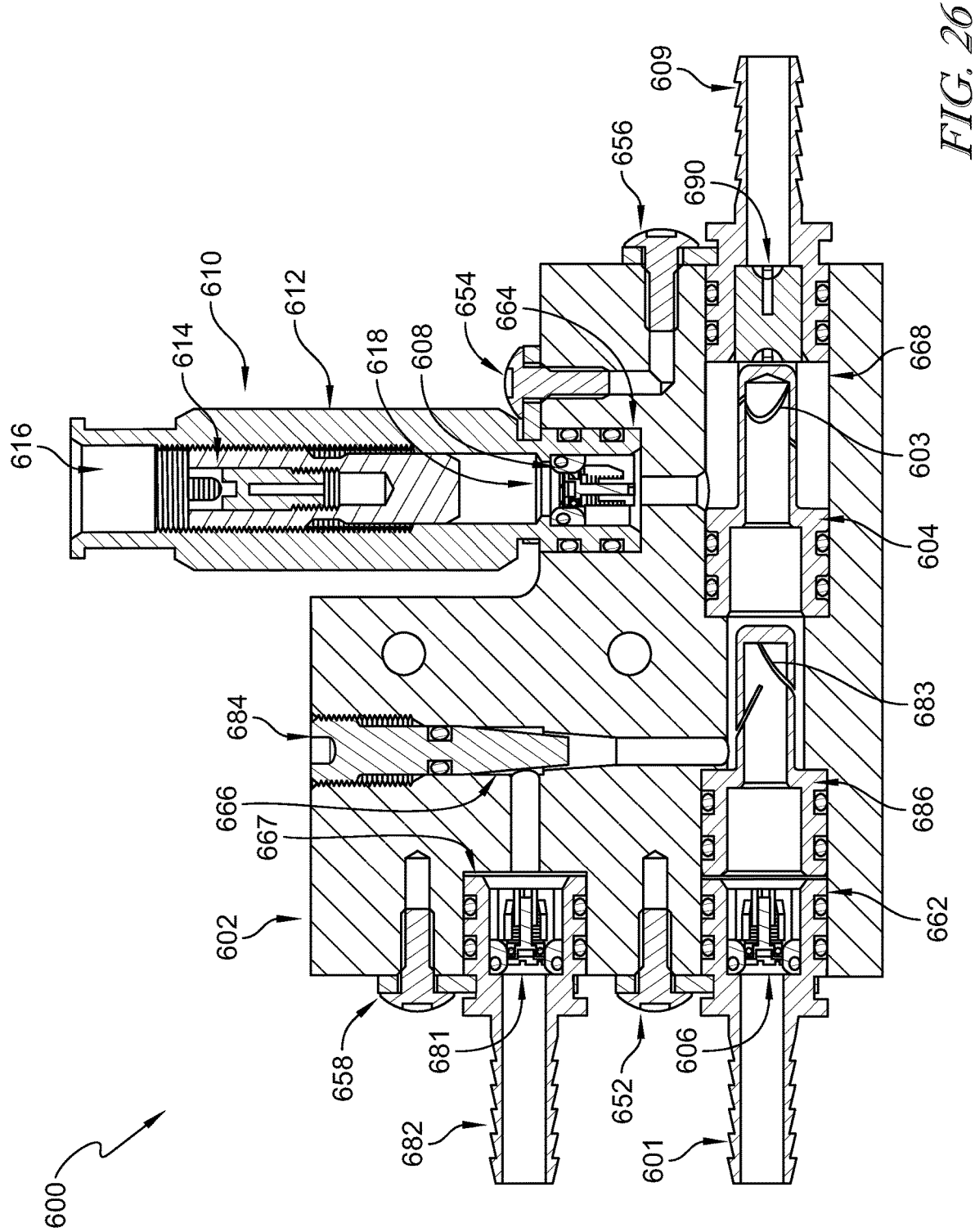
FIG. 26 is a sectional view taken along line 26-26 in FIG. 22 showing the injectors received in the cavities of the mixing chamber and suggesting that a flow adjuster controls an amount of additive supplied for mixing with the liquid at the first injector.

A liquid, such as water or pre-formed beverage for example, passes from liquid inlet 601 through check valve 606 and injector 686 into mixing chamber 602 as suggested in FIG. 26. The additive, such as a concentrate, flavoring, or other substance, passes from additive inlet 682 through check valve 681 into mixing chamber 602. The additive flows through cavity 666 and is forced together with the liquid to form a liquid-additive solution. The liquid-additive solution flows through injector 604 into cavity 668. A gas, such as $CO_2$ or $N_2$, passes from inlet 616 of gas-volume controller 610 through the circuitous path defined between fitting 612 and plug 614 to outlet 618, and through check valve 608, into mixing chamber 602. The liquid-additive solution and gas are forced together in mixing chamber 602 to form a gas-infused liquid that passes out of mixing chamber 602 through outlet 609. In some embodiments, the gas-infused liquid is a beverage or used in the making of a beverage.

The circuitous path controls a volume of gas delivered from inlet 616 to outlet 618 substantially independent of pressure fluctuations of the gas at inlet 616. The relatively small diameter and long length of the circuitous path regulates the amount of gas that can pass from inlet 616 to outlet 618. The diameter and length of the circuitous path can be adjusted to adjust the volume (or flow rate) of gas that passes through gas-volume controller 610. In some embodiments, one gas-volume controller 610 can be exchanged for another gas-volume controller 610 having a different configuration to allow a different volume of gas to be supplied to mixing chamber 602. In some embodiments, one gas-volume controller 610 can be exchanged for another gas-volume controller 610 of the same configuration for replacement.

Gas-volume controller 610 provides an inexpensive way to regulate gas volume delivered to mixing chamber 602. Gas-volume controller 610 is easily replaceable and exchangeable. Regulating gas flow into mixing chamber 602 maximizes consistency of the gas-infused liquid being formed by gas infuser 600. In some embodiments, no check valves are used in gas infuser 600. In some embodiments, a liquid-volume controller similar to gas-volume controller 610 is used to regulate liquid volume delivered to mixing chamber 602 through inlet 601. In some embodiments, an additive-volume controller similar to gas-volume controller 610 is used in combination with or alternatively to flow adjuster 684 to regulate additive volume delivered to mixing chamber 602 through inlet 682. In some embodiments, a gas-infused liquid-volume controller similar to gas-volume controller 610 is used to regulate gas-infused liquid volume exiting mixing chamber 602 through outlet 609.

In illustrative embodiments, gas-volume controllers in accordance with the present disclosure regulate the volume of gas provided for mixing with a volume of liquid. The flow rate of the gas does not fluctuate with fluctuations in gas pressure at an inlet of the gas-volume controller to provide consistency in the amount of gas infused with the liquid. In some embodiments, a gas-to-liquid volume ratio is maintained substantially constant with the gas-volume controller regardless of fluctuations in gas pressure at the inlet of the gas-volume controller. In some embodiments, the flow rate of gas supplied to the mixing chamber is maintained substantially constant with the gas-volume controller regardless of fluctuations in gas pressure at the inlet of the gas-volume controller.

In illustrative embodiments, a gas infuser in accordance with the present disclosure for forming a gas-infused liquid includes a mixing chamber, a liquid injector, and a gas-volume controller. The liquid injector is coupled to the mixing chamber and adapted to pass a liquid into the mixing chamber. The gas-volume controller is coupled to the mixing chamber and configured to pass a gas into the mixing chamber for mixing with the liquid to form the gas-infused liquid. The gas-volume controller includes an inlet and an outlet separated from the inlet. The inlet is operatively coupled to a gas supply for receiving the gas. The outlet is operatively coupled to the mixing chamber to pass the gas into the mixing chamber. The gas-volume controller is configured to provide a flow rate of gas exiting the outlet for a set average pressure of the gas at the inlet. The gas-volume controller is formed to define a circuitous path between the inlet and the outlet. The circuitous path is configured to regulate the flow rate of the gas exiting the outlet to be substantially constant such that the flow rate is substantially independent of pressure fluctuations from the set average pressure of the gas at the inlet.

In illustrative embodiments, a gas-volume controller in accordance with the present disclosure includes an inlet, an outlet separated from the inlet, and a circuitous path formed between the inlet and the outlet. The circuitous path is configured to regulate a flow rate of gas exiting the outlet to be substantially constant such that the flow rate is substantially independent of pressure fluctuations from a set average pressure of the gas at the inlet.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

What is claimed is:

1. A gas infuser for forming a gas-infused liquid, the gas infuser comprising:
   a mixing chamber;
   a liquid injector coupled to the mixing chamber and adapted to pass a liquid into the mixing chamber; and
   a gas-volume controller coupled to the mixing chamber and configured to pass a gas into the mixing chamber for mixing with the liquid to form the gas-infused liquid, the gas-volume controller including an inlet and an outlet spaced apart from the inlet, a one-piece fitting, the fitting defining the inlet and the outlet, the inlet operatively coupled to a gas supply for receiving the gas, the outlet operatively coupled to the mixing chamber to pass the gas into the mixing chamber, an elongate structure arranged between and separating the outlet from the inlet, a first opening arranged at one end of the elongate structure adjacent the inlet and a second opening arranged at an opposite end of the elongate structure adjacent the outlet,
   wherein the gas-volume controller is configured to provide a flow rate of gas exiting the outlet for a set average pressure of the gas at the inlet, the gas-volume controller is formed to define a circuitous helical path between the first opening and the second opening to fluidly couple the inlet to the outlet, and the circuitous helical path is configured to regulate the flow rate of the gas exiting the outlet to be substantially constant such that the flow rate is substantially independent of pressure fluctuations from the set average pressure of the gas at the inlet.

2. The gas infuser of claim 1, wherein the gas-volume controller further includes:
   a capillary tube coupled to the fitting in fluid communication with the inlet and the outlet, the capillary tube defining the circuitous helical path.

3. The gas infuser of claim 2, wherein the capillary tube includes a coil and stems extending from opposing ends of the coil, wherein the circuitous helical path is formed through the coil and the stems.

4. The gas infuser of claim 3, wherein the fitting is formed to include the first opening in fluid communication with the inlet and the second opening in fluid communication with the outlet, and wherein one of the stems of the capillary tube is received in the first opening and the other of the stems is received in the second opening.

5. The gas infuser of claim 1, further comprising a filter element coupled to the inlet.

6. The gas infuser of claim 1, further comprising a check valve coupled between the gas-volume controller and the mixing chamber, the check valve configured to block fluid from passing out of the mixing chamber into the gas-volume controller.

7. The gas infuser of claim 1, further comprising a check valve coupled to the liquid injector, the check valve configured to block fluid from passing out of the mixing chamber through the liquid injector.

8. A gas-volume controller comprising:

an inlet;

an outlet spaced apart from the inlet;

a one-piece fitting, the one-piece fitting defining the inlet and the outlet;

the fitting having an elongate structure arranged between and separating the outlet from the inlet;

a first opening arranged at one end of the elongate structure adjacent the inlet and a second opening arranged at an opposite end of the elongate structure adjacent the outlet; and a circuitous helical path formed between the first opening and the second opening to fluidly couple the inlet to the outlet, wherein the circuitous helical path is configured to regulate a flow rate of gas exiting the outlet to be substantially constant such that the flow rate is substantially independent of pressure fluctuations from a set average pressure of the gas at the inlet.

9. The gas-volume controller of claim 8, wherein the gas-volume controller further includes:

a capillary tube coupled to the fitting in fluid communication with the inlet and the outlet, the capillary tube defining the circuitous helical path.

10. The gas-volume controller of claim 9, wherein the capillary tube includes a coil and stems extending from opposing ends of the coil, wherein the circuitous helical path is formed through the coil and the stems.

11. The gas-volume controller of claim 10, wherein the fitting is formed to include the first opening in fluid communication with the inlet and the second opening in fluid communication with the outlet, and wherein one of the stems of the capillary tube is received in the first opening and the other of the stems is received in the second opening.

12. The gas-volume controller of claim 1, further comprising a filter element coupled to the inlet.

13. The gas-volume controller of claim 1, further comprising a check valve coupled to the outlet, the check valve configured to block fluid from passing through the check valve into the gas-volume controller.

14. A gas infuser for forming a gas-infused liquid, the gas infuser comprising:

a mixing chamber;

a liquid injector coupled to the mixing chamber and adapted to pass a liquid into the mixing chamber; and a gas-volume controller coupled to the mixing chamber and configured to pass a gas into the mixing chamber for mixing with the liquid to form the gas-infused liquid, the gas-volume controller including:

a fitting having an inlet and an outlet spaced apart from the inlet, the fitting having an elongate structure arranged between and separating the outlet from the inlet, and a first opening arranged at one end of the elongate structure adjacent the inlet and a second opening arranged at an opposite end of the elongate structure adjacent the outlet; and a capillary tube coupled to the fitting in fluid communication with the first and second openings, wherein the capillary tube is formed to define a circuitous helical path between the first opening and the second opening to fluidly couple the inlet to the outlet and configured to regulate a flow rate of gas that can pass from the inlet to the outlet.

15. The gas infuser of claim 14, wherein the capillary tube includes a coil and stems extending from opposing ends of the coil, wherein the circuitous helical path is formed through the coil and the stems.

16. The gas infuser of claim 15, wherein the fitting is formed to include the first opening in fluid communication with the inlet and the second opening in fluid communication with the outlet, and wherein one of the stems of the capillary tube is received in the first opening and the other of the stems is received in the second opening.

17. The gas infuser of claim 14, further comprising a filter element coupled to the inlet.

18. The gas infuser of claim 14, further comprising a check valve coupled between the gas-volume controller and the mixing chamber, the check valve configured to block fluid from passing out of the mixing chamber into the gas-volume controller.

19. The gas infuser of claim 14, further comprising a check valve coupled to the liquid injector, the check valve configured to block fluid from passing out of the mixing chamber through the liquid injector.

\* \* \* \* \*